(12) United States Patent
Wada et al.

(10) Patent No.: US 8,026,294 B2
(45) Date of Patent: Sep. 27, 2011

(54) WATER ABSORBENT RESIN COMPOSITION AND METHOD FOR PRODUCING THE SAME

(75) Inventors: Katsuyuki Wada, Himeji (JP); Yasuhisa Nakashima, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/681,874

(22) PCT Filed: Oct. 10, 2008

(86) PCT No.: PCT/JP2008/068491
§ 371 (c)(1),
(2), (4) Date: May 13, 2010

(87) PCT Pub. No.: WO2009/048145
PCT Pub. Date: Apr. 16, 2009

(65) Prior Publication Data
US 2010/0240808 A1    Sep. 23, 2010

(30) Foreign Application Priority Data

Oct. 10, 2007 (JP) ................................. 2007-264662
Apr. 14, 2008 (JP) ................................. 2008-104250
Sep. 3, 2008 (JP) ................................. 2008-225857
Sep. 3, 2008 (JP) ................................. 2008-225858

(51) Int. Cl.
*A61L 9/013* (2006.01)
(52) U.S. Cl. ...................................................... 523/102
(58) Field of Classification Search ........................ 523/2
See application file for complete search history.

(56) References Cited

U.S. PATENT DOCUMENTS

| | | | | |
|---|---|---|---|---|
| 5,904,028 | A * | 5/1999 | Fujiura et al. ................... | 53/431 |
| 5,980,879 | A | 11/1999 | Hiroki et al. | |
| 2001/0053807 | A1 | 12/2001 | Miyake et al. | |
| 2003/0004479 | A1 | 1/2003 | Ueda et al. | |
| 2004/0048955 | A1 * | 3/2004 | Wada et al. ....................... | 524/9 |
| 2004/0157989 | A1 | 8/2004 | Bruhn et al. | |
| 2004/0164029 | A1 | 8/2004 | Souter | |
| 2005/0221980 | A1 * | 10/2005 | Adachi et al. ................. | 502/402 |
| 2007/0078248 | A1 | 4/2007 | Adachi | |
| 2008/0075937 | A1 * | 3/2008 | Wada et al. ................... | 428/212 |

FOREIGN PATENT DOCUMENTS

| | | |
|---|---|---|
| EP | 0 701 812 | 3/1996 |
| EP | 1 099 474 | 5/2001 |
| JP | 60-158861 | 8/1985 |
| JP | 63-135501 | 6/1988 |
| JP | 01-221165 | 9/1989 |
| JP | 1-221165 | 9/1989 |
| JP | 02-041155 | 2/1990 |
| JP | 03-059075 | 3/1991 |
| JP | 04-139104 | 5/1992 |
| JP | 05-179053 | 7/1993 |
| JP | 07-165981 | 6/1995 |
| JP | 8-99851 | 4/1996 |
| JP | 08-099851 | 4/1996 |
| JP | 09-208787 | 8/1997 |
| JP | 10-43584 | 2/1998 |
| JP | 11-116829 | 4/1999 |
| JP | 11-241030 | 9/1999 |
| JP | 2000-051339 | 2/2000 |
| JP | 2000-334033 | 5/2000 |
| JP | 2000-334033 | 12/2000 |
| JP | 2001-232188 | 8/2001 |
| JP | 2001/232188 | 8/2001 |
| JP | 2001-293370 | 10/2001 |
| JP | 2002-285021 | 10/2002 |
| JP | 2002-306584 | 10/2002 |
| JP | 2004-156010 | 6/2004 |
| JP | 2004-315502 | 11/2004 |
| JP | 2005-040595 | 2/2005 |
| JP | 2005-40595 | 2/2005 |
| JP | 2005-87125 | 4/2005 |
| WO | WO 00/01479 | 1/2000 |

OTHER PUBLICATIONS

English Translation of PCT Notification Concerning Transmittal of International Preliminary Report on Patentability for International Application No. PCT/JP2008/068491, dated May 20, 2010, 7 pages.

* cited by examiner

*Primary Examiner* — Peter Szekely
(74) *Attorney, Agent, or Firm* — Occhiuti Rohlicek & Tsao LLP

(57) ABSTRACT

An object is to provide a water absorbent resin composition containing a water absorbent resin as a main component, with excellent deodorant property and antimicrobial property without impairing appearance and absorption characteristics of the water absorbent resin. The water absorbent resin composition according to the first aspect includes a water absorbent resin containing a polyacrylic acid (salt)-based water absorbent resin as a main component, and an extract of bamboo and an extract of tea. The water absorbent resin composition according to the second aspect includes a water absorbent resin containing a polyacrylic acid (salt)-based water absorbent resin as a main component, and at least two kinds of compounds selected from a group consisting of hexanoic acid (salt), ethyl butyrate, and 3-methyl-2-cyclopenten-1-one. In addition, the method for producing the water absorbent resin composition according to the third aspect includes the step of adding an alcoholic solution of an extract of bamboo, before or after polymerization of an unsaturated monomer containing an acrylic acid (salt) as a main component.

20 Claims, No Drawings

WATER ABSORBENT RESIN COMPOSITION AND METHOD FOR PRODUCING THE SAME

CROSS REFERENCE TO RELATED APPLICATIONS

This application is a National Stage of International Application No. PCT/JP2008/068491, filed on Oct. 10, 2008, which claims the priority of Japanese Application No. 2007-264662 filed Oct. 10, 2007, Japanese Application No. 2008-104250 filed Apr. 14, 2008, Japanese Application No. 2008-225857 filed Sep. 3, 2008, and Japanese Application No. 2008/225858 filed Sep. 3, 2008. The content of the prior application mentioned above is incorporated herein by reference in its entirety.

TECHNICAL FIELD

The present invention relates to a water absorbent resin composition and a method for producing the same. In more detail, the present invention relates to a water absorbent resin composition provided with both superior deodorant property and antimicrobial property without accompanying with deterioration of appearance caused by coloring derived from additives and decrease in absorbing characteristics, and can be suitably used for absorption articles such as a paper diaper, a sanitary napkin, and an incontinence pad, and a method for producing the same.

BACKGROUND ART

In recent years, a water absorbent resin has been widely used in absorbent articles such as a disposable diaper, a sanitary napkin and an incontinent pad, as an absorbent material to absorb body liquid such as urine or blood.

As the water absorbent resin, for example, there have been known a cross-linked product of partially neutralized polyacrylic acid, a hydrolysate of a starch-acrylonitrile graft polymer, a neutralized product of a starch-acrylonitrile graft polymer, a saponified product of a vinyl acetate-acrylate ester copolymer, a cross-linked product of carboxymethylcellulose, a hydrolysate of an acrylonitrile copolymer or an acrylamide copolymer, or a cross-linked product thereof, a cross-linked product of a cationic monomer, a cross-linked isobutylene-maleic acid copolymer, and a cross-linked product of 2-acrylamide-2-methylpropane sulfonic acid and acrylic acid or the like.

It is desirable that the water absorbent resin is superior generally in absorbency, absorption rate in contacting with aqueous liquid such as body liquid, liquid permeability, gel strength of a swollen gel, as well as water absorbing characteristics such as sucking amount to suck up water from a substrate containing aqueous liquid. In addition, it is desirable that the water absorbent resin to be used for, in particular, a diaper or the like, is provided with deodorant function and antimicrobial function, other than such absorbing characteristics. Under these circumstances, various investigations have been performed to furnish deodorant function and antimicrobial function by adding deodorant or antimicrobial agent to the water absorbent resin.

As an attempt to furnish deodorant function and antimicrobial function to the water absorbent resin, there has been proposed a method for adding various deodorants and/or antimicrobial agents in combination. For example, in JP-A-60 (1985)-158861, there is described a water absorbent resin composition (a water absorbing agent) composed of the water absorbent resin and an extract of leaves of a Theaceae plant. In JP-A-11 (1999)-241030, there is described a water absorbent resin composition containing an extract essence of a coniferous tree and the water absorbent resin having specific performance. In U.S. Pat. No. 5,980,879, there is described a deodorant water absorbent resin composition dispersed with zeolite particles inside the water absorbent resin. In JP-A-12 (2000)-051339, there is described a persistent antimicrobial deodorant provided with a powder of at least one kind of an extract of horseradish, an extract of mustard, or allyl isothiocyanate, and a water absorbent gelling agent as a persistent agent to maintain antimicrobial and deodorant action of said powder. In WO00/001479, there is described a powder-like water absorbent resin composition, having deodorant property and antimicrobial property, composed of the water absorbent resin, a compound having antimicrobial function against an ammonia-producing bacteria, and a drug having neutralization capability or the neutralization capability and adsorption capability against ammonia. In US-A-2001/0053807, there is described a water absorbent resin composition etc. containing a water-soluble deodorant in a specific water absorbent resin.

In addition, there have been performed also attempts to furnish deodorant function to the absorbent articles used the water absorbent resin. For example, in JP-A-02 (1990)-041155, there are described absorbent articles containing a tea product and a water absorbent resin. In JP-A-63 (1988)-135501, there is described a disposable diaper containing a resin having benzalkonium chloride and/or chlorhexidine gluconate in a water absorbent resin.

Further, there have been reported various attempts other than the above. For example, in JP-A-04 (1992)-139104, there is described a gel-like pesticide obtained by making absorbed aqueous emulsion having a volatile monoterpene-based compound as a main component, into a water absorbent resin. In JP-A-03 (1991)-059075, there is described a production method for an antimicrobial resin composition provided with an antimicrobial coating film at the surface of a water absorbent resin, by removing a volatile solvent, after adhering a liquid dissolved with or dispersed with an antimicrobial agent in the volatile solvent, onto the water absorbent resin. In JP-A-05 (1993)-179053 and JP-A-07 (1995)-165981, there is described a water absorbent resin containing a phosphate salt furnished with an antimicrobial property. In JP-A-11 (1999)-116829, there is described a water absorbent resin composition composed of a water absorbent resin, tannic acid (salt) and a composite silicate compound. In JP-A-09 (1997)-208787, there is described a water absorbent resin composition having a natural antimicrobial component extracted from a grape-fruit seed and/or herb included into or supported onto a water absorbent resin. In US-A-2003/0004479 and US-A-2004/0048955, there is described a particle-like water absorbent resin composition containing a plant powder and a surface-treated water absorbent resin, and having a malodor removing index of equal to or higher than 180. In US-A-2004-157989, there is described a water absorbent resin composition bound with cyclodextrin and/or a cyclodextrin derivative on a water absorbent resin by a covalent bond and/or an ionic bond. In WO01/41819, there is described a water absorbent resin composition composed of a water absorbent resin and a silver salt or colloidal silver.

DISCLOSURE OF INVENTION

The above conventionally known general deodorant can exert deodorant action by chemical reaction with a malodor component or adsorption of a malodor component. However, such a deodorant does not exert sufficient deodorant effect against unpleasant odor of urine, and also cannot suppress decomposition or rotting of organic substances caused by microorganisms. On the other hand, although a conventionally known general antimicrobial agent can suppress generation of malodor caused by decomposition or rotting, it has low deodorant effect against urine odor just after excretion. Accordingly, there was a problem that desired deodorant performance and antimicrobial performance cannot be obtained, even by using the water absorbent resin added with such a deodorant and/or an antimicrobial agent for the absorbent articles such as a disposable diaper.

In addition, depending on kinds of the deodorant and antimicrobial agent, there may be the case where the water absorbent resin gives brown or yellow coloring, and had a problem of giving uncomfortable feeling in view of appearance. For example, because the extract of tea requires relatively large amount of addition to furnish sufficient deodorant function, coloring of the surface of the water absorbent resin was unavoidable. Further, with time passage, the water absorbent resin discolors to brown or yellow, therefore it was not suitable for long period of storage.

Further, an antimicrobial agent to suppress proliferation of a microorganism, such as ammonia-producing bacteria, is preferably a component derived from a natural substance, in view of safety. However, many of such antimicrobial agents have odor, and was extremely difficult to have both deodorant property and antimicrobial property.

The present invention is provided under such circumstances, and it is an object of the present invention to provide a means to furnish both superior deodorant property and antimicrobial property without impairing appearance and water absorbing characteristics of the water absorbent resin, in the water absorbent resin composition having the water absorbent resin as a main component.

The present inventors have intensively studied a way to solve the above-described problems, and as a result, have found that superior deodorant property and antimicrobial property can be attained, while maintaining appearance and water absorbing characteristics of the water absorbent resin, by adding both of the extract of bamboo and the extract of tea to the polyacrylic acid (salt)-based water absorbent resin. As a result of further study, it has been discovered that similar effect to the above can be obtained, by adding a specific compound contained in the extract of bamboo to the water absorbent resin. Further, it has been discovered that similar effect to the above can be attained, also by adding an alcoholic solution containing the extract of bamboo to an unsaturated monomer as a raw material of the water absorbent resin or after polymerization thereof. Then, based on the above knowledge, the present invention has been completed.

That is, a first aspect of the present invention is a water absorbent resin composition, which contains a water absorbent resin containing a polyacrylic acid (salt)-based water absorbent resin as a main component and an extract of bamboo and an extract of tea.

A second aspect of the present invention is a water absorbent resin composition, which contains a water absorbent resin containing a polyacrylic acid (salt)-based water absorbent resin as a main component and at least two kinds of compounds selected from a group consisting of hexanoic acid (salt), ethyl butyrate, and 3-methyl-2-cyclopenten-1-one.

A third aspect of the present invention is a method for producing a water absorbent resin composition, which contains the step of adding an alcoholic solution of an extract of bamboo before or after polymerization of an unsaturated monomer containing acrylic acid (salt) as a main component.

According to the present invention, the water absorbent resin composition having both superior deodorant property and antimicrobial property, without accompanying with deterioration of appearance caused by coloring and decrease in absorbing characteristics, can be provided.

BEST MODE FOR CARRYING OUT THE INVENTION

Explanation will be given below in detail on preferable embodiments of the present invention, however, it should be understood that the technical scope of the present invention should be specified, based on description of the claims, and should not be limited only to the following specific embodiments.

[The Water Absorbent Resin Composition]

The water absorbent resin composition relevant to the first aspect of the present invention contains the water absorbent resin containing the polyacrylic acid (salt)-based water absorbent resin as a main component, and the extract of bamboo and the extract of tea.

In addition, the water absorbent resin composition relevant to the second aspect of the present invention contains the water absorbent resin containing the polyacrylic acid (salt)-based water absorbent resin as a main component, and at least two kinds of compounds selected from a group consisting of hexanoic acid (salt), ethyl butyrate, and 3-methyl-2-cyclopenten-1-one.

It should be noted that, the water absorbent resin composition relevant to the present invention has preferably a form of substantially integrated and particle-like form.

Explanation will be given below on structural components contained in the water absorbent resin composition relevant to the present embodiment.

(The Water Absorbent Resin)

The water absorbent resin composition contains the water absorbent resin. In the present invention, "the water absorbent resin" refers to a water-swelling and water-insoluble resin, where a cross-linked structure is introduced to a polymer obtained by polymerization of an unsaturated monomer having ethylene-type unsaturated double bonds. The relevant water-swelling property can be expressed by absorbency against non-pressure (CRC) against a normal saline solution, and it is preferably equal to or higher than 2 g/g, more preferably from 5 to 200 g/g, and still more preferably from 20 to 100 g/g. In addition, the relevant water-insoluble property can be expressed by amount of water-soluble portions in the resin, and it is preferably from 0 to 50% by mass, more preferably from 0 to 25% by mass, still more preferably from 0 to 15% by mass, and particularly preferably from 0 to 10% by mass. In addition, water content of the water absorbent resin composition and the water absorbent resin is, in view of impact resistance characteristics (property stability against mechanical damage), preferably from 0 to 7% by mass, more preferably from 0 to 5% by mass, still more preferably from 0 to 3% by mass, and particularly preferably from 0 to 1% by mass. It should be noted that, measurement methods for absorbency against non-pressure (CRC), an amount of water-soluble portions and a water content will be specified in Examples to be described later.

Ratio of the water absorbent resin contained in the water absorbent resin composition is preferably from 50 to 100% by mass, more preferably from 70 to 100% by mass, and still more preferably from 80 to 100% by mass, relative to total mass of the water absorbent resin composition. By containing the water absorbent resin in such an amount, superior absorbing characteristics can be exerted.

The water absorbent resin contains the polyacrylic acid (salt)-based water absorbent resin as a main component, in view of little coloring or properties. In the present invention, "the polyacrylic acid (salt)-based water absorbent resin" means the water absorbent resin having repeating units derived from acrylic acid (salt), and includes any of a homopolymer obtained by polymerization of only acrylic acid (salt), and a heteropolymer obtained by polymerization of acrylic acid (salt) and unsaturated monomers other than this.

The unsaturated monomers other than acrylic acid (salt) is not especially limited, and conventionally known monomers having ethylene-type unsaturated double bonds may be selected as appropriate, and includes, for example, methacrylic acid, maleic acid (anhydride), fumaric acid, crotonic acid, itaconic acid, vinyl sulfonic acid, 2-(meth)acrylamide-2-methylpropane sulfonic acid, (meth)acryloxyalkane sulfonic acid, and an alkali metal salt or an ammonium salt thereof; N-vinyl-2-pyrrolidone, N-vinylacetamide, (meth)acrylamide, N-isopropyl(meth)acrylamide, N,N-dimethyl (meth)acrylamide, 2-hydroxyethyl (meth)acrylate, methoxypolyethylene glycol (meth)acrylate, polyethylene glycol (meth)acrylate, isobutylene, lauryl (meth)acrylate and the like. These unsaturated monomers may be used alone or two or more kinds in combination.

Number of a repeating unit derived from acrylic acid (salt), contained in the polyacrylic acid (salt)-based water absorbent resin, is preferably from 10 to 100%, more preferably from 50 to 100%, still more preferably from 70 to 100%, and particularly preferably from 90 to 100%, relative to total number of the repeating unit derived from the unsaturated monomer.

It is preferable that an acid group contained in the polyacrylic acid (salt)-based water absorbent resin is partially neutralized in view of properties. Ratio of the acid group to take part in the neutralization (neutralization ratio) is usually from 10 to 99%, preferably from 20 to 99%, more preferably from 40 to 95%, still more preferably from 50 to 90%, particularly preferably from 50 to 80%, and most preferably from 60 to 75%, relative to total number of the acid groups contained in the polyacrylic acid (salt)-based water absorbent resin. The acid group forms a monovalent salt such as an alkali metal salt of such as lithium, sodium, and potassium; an ammonium salt; an amine salt, by neutralization. Among these monovalent salts, it is preferable to be converted to an alkali metal salt. It should be noted that, the neutralization step may be performed in any stage of the production process of the water absorbent resin. For example, it may be performed to the unsaturated monomer of acrylic acid (salt) before polymerization, or a polymer after polymerization, or it is possible to be performed during a polymerization reaction, and further it is possible to use these in combination. In view of uniformity of the neutralization, it is preferable that the neutralization is performed at the stage of the unsaturated monomer of acrylic acid (salt).

Ratio of the polyacrylic acid (salt)-based water absorbent resin contained in the water absorbent resin, is not especially limited, as long as it is a main component (from 50 to 100% by mass) to total mass of the water absorbent resin, however, it is preferably from 70 to 100% by mass, and more preferably from 90 to 100% by mass.

The water absorbent resin is capable of containing a water absorbent resin other than the polyacrylic acid (salt)-based water absorbent resin, as long as the polyacrylic acid (salt)-based water absorbent resin is a main component. The water absorbent resin other than the polyacrylic acid (salt)-based water absorbent resin is not especially limited, and a conventionally known material can be adopted as appropriate and, there are included, for example, a polyamine-based water absorbing resin such as a cross-linked product of polyethylene imine, a cross-linked product of polyallyl amine; and a nonion-based water-absorbing resin such as a cross-linked product of polyacrylamide, a cross-linked product of polyethyleneoxide. These water absorbent resins may be used alone or two or more kinds in combination.

(The Extract of Bamboo)

A bamboo for use in the extract of bamboo is not especially limited, as long as it is a perennial evergreen herbaceous plant belonging to Poaceae, Bambusioideae and Sasa subfamily or Bamboo subfamily, and includes, for example, Phyllostachys bambusoides, Phyllostachys pubescens, Phyllostachys nigra var. henonis, Phyllostachys aurea, Phyllostachys heterocycla, Bambusa multiplex, Semiarundinaria fastuosa, Sasa kurilensis, Sinobambusa tootsik, Tetragoncalamus quadrangularis, Chimonobambusa marmorea, Pseudosasa japonica, Pleioblastus Simonii, Sasa nipponica, and Sasa gracillima or the like.

The extract of bamboo may have any form, as long as it is one obtained by separation of components contained in bamboo, using various kinds of extraction methods. For example, there are included extracted components (excluding an extraction solvent) extracted from bamboo or a bamboo powder, using an extraction solvent such as a hydrophilic organic solvent (alcohol or ether or the like) or water; or a dry distillation extract of bamboo such as bamboo vinegar liquid or the like, which is a vaporized component extractable by dry distillation of bamboo or a ground bamboo chip or the like by heating under reduced pressure. The extract of bamboo may naturally be one further purified after extraction of bamboo. These extracts of bamboo contain a furan-based compound and a phenol-based compound as main components. These extract of bamboo may take any of a solid, liquid or vapor state, however, it is preferable to be a solid or liquid under normal temperature and pressure (25° C., 1 atmosphere (1013 hPa)). In particular, the extract of bamboo, which is liquid at normal temperature and normal pressure, may also be called "extract liquid of bamboo".

A portion of bamboo to be used for the extract of bamboo is not especially limited, however, preferably a stem part of bamboo is used. In addition, in extraction, it is preferable to extract after converting to a chip-state or a powder state by grinding as fine as possible. In the stem part of bamboo, in particular, one extracted from a surface skin part, within 0.5 mm from the surface, is particularly effective, in view of attaining the object of the present invention. Utilization of the surface skin part is attained by polishing the outer circumference part of the stem, by moving dried bamboo against a cutting blade of a cylindrical polishing machine, and by collecting polished powders. However, active components are contained also in the parts other than the surface skin, therefore there is no problem in the extracts from all parts of the stem part of bamboo. In particular, in the case of slender bamboo or bamboo grass, it is not practical to separate only the surface skin part, and thus it is preferable to extract using a stem part or all parts including the stem and leaves.

As a more detailed form of the dry distillation extract of bamboo, there can be used a dry distillation extract under reduced pressure, obtained by dry distillation under reduced pressure condition, after grinding and drying, if necessary, of bamboo (preferably Phyllostachys pubescens). As reduced pressure condition, it is preferably equal to or lower than 100 mm Hg, more preferably from 10 to 60 mm Hg, still more preferably from 15 to 45 mm Hg. An initial distillate in dry distillation under reduced pressure may be cut off as appropriate, or the resultant dry distillation extract under reduced pressure may be subjected to further purification processing. The dry distillation extract of bamboo, obtained by dry distillation under normal pressure, or dry distillation under condition of small degree of reduced pressure, has relatively small effect of the present invention, and tends to require a large quantity of the addition of the dry distillation extract of bamboo to obtain sufficient effect. Distillation temperature of the dry distillation extract of bamboo, in the above dry distillation under reduced pressure, depends on degree of reduced pressure (the larger degree of reduced pressure requires the lower temperature, and the smaller degree of reduced pressure requires the higher temperature), however, it is, for example, around 300° C. in the case of dry distillation under a reduced pressure of 20 mm Hg. Since the dry distillation extract of bamboo under reduced pressure obtained by the above operation is usually viscous liquid, it is suitable to use by once receiving the effluent in water, ethanol, propylene glycol or the like, and then after adjusting concentration with water or ethanol.

In addition, as a specific example of an extraction method other than dry distillation under reduced pressure, there is a method for steam treatment in the presence of steam at 120 to 180° C., then cooling, and if necessary, after that, for preparing a solution by a solvent, containing an alcohol with a carbon atom of 1 to 4, in particular, a mono-alcohol with a carbon atom of 1 to 4. A method for obtaining the extract of bamboo by steam treatment is performed in the presence of steam, by sealing bamboo in a pressure resistant container. In this case, temperature of the solution is preferably set at from 120 to 180° C., and more preferably from 130 to 170° C., and pressure is preferably set at from 3 to 7 kg/cm$^2$. The steam treatment may be performed by putting bamboo in the pressure resistant container, and by blowing high pressure steam, or by adding a small quantity of water along with bamboo in the pressure resistant container, sealing and heating by raising pressure up to predetermined pressure with air or nitrogen. Time required in the steam treatment differs by pressure or temperature, however, it is preferably from 30 minutes to 5 hours, and more preferably from 1 hour to 4 hours. By setting extraction condition in such a way, the active components can be extracted efficiently, and thus superior economic performance can be obtained. It should be noted that, it is without discussion that it is naturally possible to adopt extraction condition other than the above range. Further, after the steam treatment, if necessary, the extract of bamboo is returned to room temperature and diluted with a solvent. The dilution solvent is preferably an alcohol with a carbon atom of 1 to 4, or a mixed solution of the alcohol with a carbon atom of 1 to 4 and water. In particular, as the alcohol with a carbon atom of 1 to 4, ethanol is used, and water-containing ethanol, containing equal to or lower than 40% of water (% by volume), and still more preferably 15 to 20% of water (% by volume), is used. It should be noted that, the above dry distillation extract and steam extraction method are used not only for bamboo of the present invention but also as a production method for the extract of tea, to be described later.

Among the above extracts of bamboo, in view of deodorant performance and antimicrobial performance, use of the dry distillation extract of bamboo is preferable. The dry distillation extract of bamboo is not especially limited, however, specifically, a commercially available solution of dry distillation extract of bamboo diluted with a solvent, such as "Neobamboos-1000" (mass ratio of the dry distillation extract of bamboo:ethanol:water is 20:70:10, produced by Shiraimatsu Pharmaceutical Co., Ltd.) or "Neobamboos-2000" (mass ratio of the dry distillation extract of bamboo:ethanol is 70:30, produced by Shiraimatsu Pharmaceutical Co., Ltd.), which is a solution of an extract of Phyllostachys pubescens diluted with a solvent, can be used.

Content of the extract of bamboo is not especially limited, and can be adjusted as appropriate, however, it is preferably from 0.1 to 10000 ppm by mass, more preferably from 0.1 to 1000 ppm by mass, still more preferably from 0.1 to 500 ppm by mass, particularly preferably from 1 to 100 ppm by mass, and still more particularly preferably from 1 to 50 ppm by mass, relative to total mass of the water absorbent resin. By containing the extract of bamboo in such amount, superior deodorant performance and antimicrobial performance can be exerted.

(The Extract of Tea)

Tea for use in the extract of tea is not especially limited as long as it is an ever-green woody plant belonging to Theales Theaceae Camellia, however, it is preferable to be *Camellia sinensis*.

The extract of tea may take any form, as long as it is a component contained in tea separated by various kinds of extraction methods. For example, there are included extracted components (excluding an extraction solvent) extracted from tea leaves or a ground product of tea leaves, using an extraction solvent such as a hydrophobic organic solvent (alcohol or ether or the like), water or the like; or a dry distillation extract of tea, which is a vaporized component extractable by dry distillation of tea leaves or the ground product of tea leaves by heating under reduced pressure. Specifically, a commercially available solution of the extract of tea diluted with a solvent, such as "Catechin 30G" or "Catechin 60W" (they are produced by Shiraimatsu Pharmaceutical Co., Ltd.) can be used. These extracts of tea may naturally be those further purified after extraction from tea. These extracts of tea contain polyphenols (catechins) as main components. It should be noted that, in the extraction, it is preferable to use a leaf part of tea (tea leaf). The extract of tea may take any state of a solid, liquid or vapor, however, it is preferable to be a solid or liquid at normal temperature and normal pressure. In particular, an extract of tea which is liquid at normal temperature and normal pressure may be called "extract liquid of tea".

Among the above extracts of tea, in view of deodorant performance and antimicrobial performance, use of the dry distillation extract of tea is preferable. The dry distillation extract of tea is not especially limited, however, specifically a commercially available solution of dry distillation extract of tea diluted with a solvent can be used, such as Fresh E, FS-70P, FS-80P, FS-80M or FS-80MO (they are produced by Shiraimatsu Pharmaceutical Co., Ltd.) of "Fresh Shiraimatsu" (registered trademark).

Content of the extract of tea is not especially limited and can be adjusted as appropriate, however, it is preferably from 10 to 50000 ppm by mass, more preferably from 50 to 50000 ppm by mass, and still more preferably from 50 to 5000 ppm by mass, relative to total mass of the water absorbent resin. By containing the extract of tea in such amount, superior deodorant performance and antimicrobial performance can be exerted.

In the first aspect of the present invention, the extract of bamboo and the extract of tea are contained essentially, and in this case, ratio of the extract of bamboo and the extract of tea, in the extract of bamboo/the extract of tea (mass conversion), is preferably from 0.01/99.99 to 49/51, more preferably from 0.01/99.99 to 40/60, still more preferably from 0.01/99.99 to 30/70, and particularly preferably from 0.05/99.95 to 30/70. By having content of the extract of bamboo and the extract of tea and ratio thereof in such a range, superior deodorant performance and antimicrobial performance can be obtained.

In addition, there is no worry of presenting malodor or coloring, discoloring derived from the extract of bamboo and the extract of tea.

It should be noted that, the water absorbent resin composition obtained by adding a powder obtained by crushing or grinding bamboo or tea, without using the above extract of bamboo and the extract of tea, has low dispersion property of the powder of bamboo or tea, therefore provides difficulty in making uniform or integrated with the water absorbent resin, thus could not provide desired deodorant effect and antimicrobial effect. For example, the water absorbent resin composition disclosed in JP-A-02 (1990)-091155, US-A-2003/0004479 and US-A-2004/0048955 or the like, in which the plant powder or the like are added into the water absorbent resin, generates variation of the addition amount of the powder of bamboo or tea by each particle of the water absorbent resin composition. Further, in the case where the water absorbent resin composition receives mechanical impact, the powder of bamboo or tea may be eliminated from the water absorbent resin composition. Therefore, it could reduce deodorant effect and antimicrobial effect in the water absorbent resin composition obtained by adding the powder of bamboo or tea.

A production method for the extract of bamboo and the extract of tea is not especially limited, however, methods described, for example, in U.S. Pat. No. 4,501,730, JP-A-63 (1988)-290825, JP-B-3212278, JP-A-2006-116433, and JP-B-3551386 can be utilized.

(Hexanoic Acid (Salt), Ethyl Butyrate, and 3-methyl-2-cyclopenten-1-one)

The water absorbent resin composition relevant to the second aspect of the present invention contains essentially at least two kinds of compounds selected from a group consisting of hexanoic acid (salt), ethyl butyrate, and 3-methyl-2-cyclopenten-1-one, as a deodorant component and an antimicrobial component. In particular, it is preferable to contain three kinds of compounds of hexanoic acid (salt), ethyl butyrate, and 3-methyl-2-cyclopenten-1-one. By using these compounds in combination, superior deodorant performance and antimicrobial performance can be attained. It should be noted that, hexanoic acid (salt), ethyl butyrate, and 3-methyl-2-cyclopenten-1-one to be used in the present invention, may naturally be compounds chemically synthesized or compounds extracted, isolated and purified from natural products.

Content of hexanoic acid (salt), ethyl butyrate, or 3-methyl-2-cyclopenten-1-one, each independently, is preferably from 0.1 ppb by mass to 500 ppm by mass, more preferably from 0.1 ppb by mass to 100 ppm by mass, still more preferably from 0.1 ppb by mass to 50 ppm by mass, and particularly preferably from 0.1 ppb by mass to 30 ppm by mass, relative to total mass of the water absorbent resin. Among these, total content of at least two kinds of compounds selected from a group consisting of hexanoic acid (salt), ethyl butyrate, and 3-methyl-2-cyclopenten-1-one is preferably from 0.2 ppb by mass to 1000 ppm by mass, more preferably from 0.2 ppb by mass to 500 ppm by mass, still more preferably from 0.2 ppb by mass to 100 ppm by mass, particularly preferably from 0.2 ppb by mass to 50 ppm by mass, and most preferably from 0.2 ppb by mass to 30 ppm by mass, relative to total mass of the water absorbent resin. It should be noted that, content ratio of these compounds is not especially limited, as long as content of each of hexanoic acid (salt), ethyl butyrate, and 3-methyl-2-cyclopenten-1-one is within the above range.

The water absorbent resin composition relevant to the present embodiment essentially contains two or more kinds among the above three components, however, further, it is preferable to contain at least one kind of a component selected from a group consisting of ethyl isobutyrate, ethyl crotonate, isobutanal diethylacetal, 2,3-dimethyl-2-cyclopentene-1-one, 2-hydroxy-3-methyl-2-cyclopentene-1-one, 3-methyl-1,2-cyclopentanedione, 4-allyl-2-methoxyphenol, furfural, and 5-methylfurfural. Content of these components, each independently, is preferably from 0.1 ppb by mass to 500 ppm by mass, more preferably from 0.1 ppb by mass to 100 ppm by mass, still more preferably from 0.1 ppb by mass to 50 ppm by mass, and particularly preferably from 0.1 ppb by mass to 30 ppm by mass, relative to total mass of the water absorbent resin.

The water absorbent resin composition relevant to the second aspect preferably contains further the extract of tee, and still more preferably contains the extract of bamboo, to enhance deodorant property and antimicrobial property. Components of the extract of tea and the extract of bamboo, and the content thereof are as described above, and thus explanation here is omitted.

It should be noted that, a water absorbent resin composition other than the water absorbent resin composition relevant to the second aspect described in the present description can also contain hexanoic acid (salt), ethyl butyrate, and 3-methyl-2-cyclopenten-1-one.

(A Chelating Agent)

It is preferable that the water absorbent resin composition contains further a chelating agent. As a more preferable form, the chelating agent is present in an integrated way inside and at the surface of a particle-like water absorbent resin composition. "The chelating agent" in the present invention means a compound which captures a metal ion such as a transition metal ion. By the addition of the chelating agent to the water absorbent resin composition, clean feeling by enhanced whiteness and superior urine resistance can be furnished, in addition to deodorant or antimicrobial characteristics.

As the chelating agent, one conventionally known can be used without especially limited, however, in view of effect, it is preferable to be a water-soluble organic chelating agent, and among these, it is preferable to be an organic chelating agent having a nitrogen atom or a phosphorous atom. As the organic chelating agent having a nitrogen atom or a phosphorous atom, for example, an aminocarboxylic acid-based chelating agent, an organic phosphoric acid-based chelating agent, and an amino phosphoric acid-based chelating agent are included.

As the aminocarboxylic acid-based chelating agent, an amine compound having a carboxyl group in the molecule, can be used without especially limited, however, among them, it is preferable to be a aminopolycarboxylic acid-based chelating agent having a plurality of carboxyl groups in the molecule. Among them, number of the carboxyl groups in one molecule of the aminopolycarboxylic acid-based chelating agent is preferably equal to or more than two, more preferably from 2 to 100, still more preferably from 3 to 20, and particularly preferably from 3 to 10.

As such aminopolycarboxylic acid-based chelating agent, specifically, there is included iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexaacetic acid, trans-1,2-diaminocyclohexane tetraacetic acid, bis(2-hydroxyethyl)glycine, diaminopropanol tetraacetic acid, ethylenediamine-2-propionic acid, glycol ether diamine tetraacetic acid, bis(2-hydroxybenzyl)ethylenediamine diacetic acid, ethylenediamine disuccinic acid, L-glutamic acid diacetic acid, 3-hydroxy-2,2'-iminodisuccinic acid, glycol ether diamine tetraacetic acid, and methylglycine diacetic acid or the like.

Use of the organic phosphoric acid-based chelating agent or aminophosphoric acid-based chelating agent is not especially limited, as long as it is an organic compound or an amine compound having a phosphate group in the molecule, however, among them, it is preferable to be a organic polyphosphoric acid-based chelating agent or aminopolyphosphoric acid-based chelating agent having a plurality of phosphate groups in the molecule, and it is more preferable to be one having three or more phosphate groups in one molecule.

As such organic polyphosphoric acid-based chelating agent or aminopolyphosphoric acid-based chelating agent, specifically, there is included hydroxyethylene diphosphoric acid having two phosphoric acid groups, or the like; ethylenediamine-N,N'-di(methylenephosphinic acid), ethylenediamine tetra(methylenephosphinic acid), nitriloacetic acid-di(methylenephosphinic acid), nitrilodiacetic acid-(methylenephosphinic acid), nitriloacetic acid-β-propionic acid-methylenephosphonic acid, nitrilo tris(methylenephosphonic acid), cyclohexanediamine tetra(methylenephosphonic acid), ethylenediamine-N-N'-diacetic acid-N,N'-di(methylenephosphonic acid), ethylenediamine-N-N'-di(methylenephosphonic acid), ethylenediamine tetra(methylenephosphonic acid), polymethylenediamine tetra(methylenephosphonic acid), diethylenetriamine penta(methylenephosphonic acid), and 1-hydroxyethylidene diphosphonic acid, having three or more than three phosphoric acid groups, or the like.

These chelating agents may be a salt form such as an aminocarboxylate, an organic phosphate, and an aminophosphate. As a preferable form, an alkali metal salt such as a sodium salt, a potassium salt; an ammonium salt and an amine salt or the like is included. These chelating agents may be used alone or two or more kinds in combination.

A weight average molecular weight of the chelating agent is preferably equal to or lower than 5000, and more preferably from 100 to 1000. The weight average molecular weight of the chelating agent within such a range provides relatively low viscosity of a solution of the unsaturated monomer before polymerization, therefore, makes control of polymerization temperature easy. In addition, there is less worry of providing adverse effect on property of the water absorbent resin composition.

A content of the chelating agent to be contained in the water absorbent resin composition is usually from 1 to 1000 ppm by mass, preferably from 10 to 500 ppm by mass, and more preferably from 10 to 100 ppm by mass, relative to total mass of the water absorbent resin or an unsaturated monomer to be described later. The content of the chelating agent within such a range provides smooth progress of polymerization, therefore, provides less worry of decreasing water absorbing characteristics, and is also capable of providing desired urine resistance and whiteness.

It should be noted that, as the addition method for the above chelating agent, it may be allowed at any of the steps of the production steps of the water absorbent resin composition, to be described later, however, in view of obtaining desired absorbing characteristics, urine resistance, enhanced whiteness, deodorant and antimicrobial characteristics, it is preferably added in the preparation step of an aqueous solution of acrylic acid (salt) and an, unsaturated monomer, the polymerization step or the granulation step exemplified in US-A-2004/18031.

(An Inorganic Powder or Organic Powder)

It is preferable that the water absorbent resin composition contains further an inorganic powder or organic powder. As a more preferable form, the inorganic powder or organic powder are present at the surface of a particle-like water absorbent resin composition. These powders have a role to enhance deodorant characteristics and antimicrobial characteristics, whiteness, along with powder fluidity under high humidity.

The inorganic powder is not especially limited, as long as it is one to be used generally in the relevant field, and includes, for example, silicon dioxide, titanium dioxide, aluminum oxide, magnesium oxide, zinc oxide, clay, talc, calcium phosphate, barium phosphate, silicic acid or salt thereof, clay, diatomaceous earth, silica gel, zeolite, bentonite, kaolin, hydroxyapatite, hydroxytalcite, vermiculite, pearlite, isolite, activated clay, quartz sand, silica stone, strontium ore, fluorite, and bauxite or the like. On the other hand, the organic powder is also not especially limited, as long as it is one to be used generally in the relevant field, and includes, for example, polyethylene, polypropylene, polyvinyl chloride, polystyrene, nylon, melanin resin, polymethyl methacrylate, starch, dextrin, and cyclodextrin or the like. These inorganic powders or organic powders may be used alone or two or more kinds in combination.

The inorganic powder or the organic powder is preferably, in general, a fine particle (particulate). Specifically, a particle diameter thereof is preferably equal to or smaller than 100 µm, more preferably equal to or smaller than 50 µm, still more preferably equal to or smaller than 10 µm. On the other hand, the lower limit value of the particle diameter is preferably equal to or larger than 1 nm, in view of workability or mixing property.

Content of the inorganic powder or the organic powder contained in the water absorbent resin composition is preferably from 0.01 to 20% by mass, and more preferably from 0.05 to 10% by mass, relative to total mass of the water absorbent resin. Amount of the inorganic powder or the organic powder within such a range is capable of providing the water absorbent resin composition superior in deodorant characteristics and antimicrobial characteristics, whiteness, along with powder fluidity under high humidity.

(A Polyvalent Metal Salt)

It is preferable that the water absorbent resin composition contains a polyvalent metal salt. As a more preferable form, the polyvalent metal salt is present at the surface of a particle-like water absorbent resin composition. In particular, in the case where the polyvalent metal salt is used with an organic surface cross-linking agent, the polyvalent metal salt acts as an inorganic surface cross-linking agent, and is capable of contributing to the surface cross-linking agent of the water absorbent resin.

The polyvalent metal salt is preferably a water-soluble polyvalent metal salt, and includes, for example, aluminum chloride, poly aluminum chloride, aluminum sulfate, aluminum nitrate, potassium aluminum bis-sulfate, sodium aluminum bis-sulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like.

Content of the polyvalent metal salt is preferably from 0 to 5% by mass, more preferably from 0.001 to 3% by mass, still more preferably from 0.01 to 2% by mass, relative to total mass of the water absorbent resin.

(A Surfactant)

It is preferable that the water absorbent resin composition contains further a surfactant. As a more preferable form, the surfactant is present at the surface of a particle-like water absorbent resin composition. The surfactant has a role to enhance powder characteristics, for example, powder fluidity or fluidity at moisture absorption etc. of the water absorbent resin composition.

As the surfactant, a conventionally known one can be adopted as appropriate, and includes, for example, an anionic surfactant such as a fatty acid salt and a higher alcohol sulfate; a cationic surfactant such as sorbitan fatty acid ester exemplified by sorbitan monolaurate, sorbitan monopalmitate, sorbitan monostearate, and sorbitan tristearate; an alkylamine salt such as coconut amine acetate, and stearylamine acetate; an amphoteric surfactant or the like. Other than the above, surfactants described in U.S. Pat. No. 6,107,358 can be adopted as appropriate.

Content of the surfactant contained in the water absorbent resin composition is preferably from 0.1 to 1000 ppm by mass, more preferably from 0.5 to 500 ppm by mass, and still more preferably from 1 to 100 ppm by mass, relative to total mass of the water absorbent resin. Amount of the surfactant within such a range is capable of providing desired particle fluidity and absorbing characteristics.

It should be noted that, a method for adding the surfactant is not especially limited, however, it is preferable to add before or after the surface cross-linking step of the water absorbent resin, and more preferably, at the granulation step exemplified in US-A-2004/18031.

(Other Additives)

The water absorbent resin composition may include still more other additives. As the additives, for example, an antimicrobial component, a reducing agent, and a coloring preventive agent such as an antioxidant or the like are included, other than the above.

As the antimicrobial component, it is preferable to be an antimicrobial component derived from a natural plant, for example, includes alkaloid such as nicotine sulfate, Phellodendron amurense, Sophora flavescens; flavonoid such as Aurantii nobilis pericarpium, *Scutellaria* root, Pueraria root; terpenoid such as essential oil; anthraquinone such as rhubarb; other compounds such as mustard oil glycoside, cyanogenetic glycoside, sulfur containing compound, and an acid amide-based compound or the like. In addition, an organic-based antimicrobial agent may be used and includes, for example, an organic natural extract, an organic aliphatic compound, an organic aromatic compound, and specifically, Hinokitiol and creosote oil or the like. Content of such additives is preferably from 0 to 2% by mass, more preferably from 0.001 to 1% by mass, relative to total mass of the water absorbent resin.

(Properties of the Water Absorbent Resin Composition)

The water absorbent resin composition of the present invention has effect to have both superior deodorant property and antimicrobial property, without deteriorating appearance caused by coloring and decreasing the absorbing characteristics. Coloring or absorbing characteristics of the water absorbent resin composition can be evaluated by measuring the particle size, the absorbency against pressure, the centrifuge retention capacity, the amount of water-soluble portions, the surface color and the amount of residual monomers and the like.

The particle size is expressed by the mass average particle diameter (D50), the logarithm standard deviation ($\sigma\zeta$) of particle size distribution and the bulk specific gravity of the water absorbent resin composition. The particle size can be adjusted within the following specified range by passing the steps of grinding, classification, granulation, micro powder recovery or the like to be described later.

The mass average particle diameter (D50) of the water absorbent resin composition is preferably from 200 to 600 µm, more preferably from 250 to 550 µm, still more preferably from 200 to 500 µm, and particularly preferably from 350 to 450 µm. In addition, the less particles having the mass average particle diameter (D50) of below 150 µm is the better, and it is preferably adjusted from 0 to 5% by mass, more preferably from 0 to 3% by mass, and still more preferably from 0 to 1% by mass, relative to total mass of the water absorbent resin composition. Further the less particles having the mass average particle diameter (D50) of 850 µm or more is the better, and it is preferably adjusted from 0 to 5% by mass, more preferably from 0 to 3% by mass, and still more preferably from 0 to 1% by mass, relative to total mass of the water absorbent resin composition. In addition, the particles between 600 to 150 µm is preferably from 60 to 100% by mass, more preferably from 70 to 100% by mass, and still more preferably from 80 to 100% by mass, relative to total mass of the water absorbent resin composition.

The logarithm standard deviation ($\sigma\zeta$) of particle size distribution is preferably from 0.20 to 0.40, more preferably from 0.27 to 0.37, and still more preferably from 0.25 to 0.35. By having such a particle size distribution, effect is enhanced in using as absorbent articles such as a disposable diaper.

The bulk density (specified by JIS K-3362) is preferably from 0.40 to 0.90 g/ml, and more preferably it is adjusted in a range from 0.50 to 0.80 g/ml.

The absorbency against pressure (AAP) is preferably equal to or higher than 20 (g/g), more preferably from 20 to 35 (g/g), and still more preferably from 25 to 35 (g/g), relative to 0.9% by mass sodium chloride under a pressure of 1.9 kPa and/or 4.9 kPa. In particular, it is preferably from 20 to 35 (g/g) under a pressure of 1.9 kPa, and from 20 to 30 (g/g) under a pressure of 4.9 kPa, and most preferably from 25 to 35 (g/g) under a pressure of 1.9 kPa, and from 20 to 30 (g/g) under a pressure of 4.9 kPa. The absorbency against pressure (AAP) against a pressure of 1.9 kPa or 4.9 kPa within such a range, for example, in the case used for a diaper, decreases return amount, what is called re-wet, and little generates skin roughness in use. It should be noted that, the relevant absorbency against pressure can be adjusted as appropriate by passing the step of surface cross-linking or the like to be described later.

The absorbency against non-pressure (CRC: Centrifuge Retention Capacity) is preferably equal to or higher than 10 g/g, more preferably equal to or higher than 20 g/g, still more preferably equal to or higher than 25 g/g, and particularly preferably equal to or higher than 30 g/g, relative to a 0.9% by mass aqueous solution of sodium chloride. The higher absorbency against non-pressure (CRC) is the better, and the upper limit value is not especially limited, however, in view of balance with other properties, it is preferably equal to or lower than 50 (g/g), more preferably equal to or lower than 45 (g/g), and still more preferably equal to or lower than 40 (g/g). The absorbency against non-pressure (CRC) of equal to or higher than 10 (g/g) increases absorption amount, and thus provides suitable use in absorbent articles such as a diaper. In addition, the absorbency against non-pressure (CRC) of equal to or lower than 50 (g/g) is capable of increasing gel strength and providing the water absorbent resin composition superior in liquid permeability. It should be noted that, the absorbency against non-pressure (CRC) can be adjusted as appropriate by passing the polymerization step to be described later.

The amount of water-soluble portions (soluble portions) is preferably from 0 to 35% by mass, more preferably from 0 to 25% by mass, still more preferably from 0 to 15% by mass, and particularly preferably from 0 to 10% by mass. The amount of water-soluble portions within such a range is capable of increasing gel strength and providing the water absorbent resin composition superior in liquid permeability.

In addition, in using a diaper for a long period of time, decrease over time in the absorbency (CRC or AAP or the like) can be prevented.

The surface color of the water absorbent resin composition can be evaluated by a WB (white balance) value measured with a spectroscopic color difference meter. The WB is preferably from 60 to 100, more preferably from 65 to 100, and still more preferably from 70 to 100. The WB within such a range is capable of preventing deterioration of appearance, and thus maintaining clean feeling.

The amount of a residual monomer (residual unsaturated monomer) contained in the water absorbent resin composition is preferably from 0 to 400 ppm by mass, more preferably from 0 to 300 ppm by mass, still more preferably from 0 to 200 ppm by mass, and particularly preferably from 0 to 100 ppm by mass.

[A Production Method for the Water Absorbent Resin Composition]

The production method for the water absorbent resin composition relevant to the present invention is not especially limited, and those skilled in the art can perform production by referring to a conventionally known method as appropriate. A general production method includes the step to produce the water absorbent resin having the polyacrylic acid (salt)-based water absorbent resin as a main component, by cross-linking polymerization of the unsaturated monomer containing acrylic acid (salt), and by drying the resultant polymer; and the step to add the deodorant component and antimicrobial component to the unsaturated monomer or the water absorbent resin.

Explanation will be given below on each step of the production method for the water absorbent resin and the water absorbent resin composition relevant to the present invention.

(Production of the Water Absorbent Resin)

The water absorbent resin is composed of the polyacrylic acid (salt)-based water absorbent resin as a main component, and can contain other water absorbent resin material, if necessary. The polyacrylic acid (salt)-based water absorbent resin can be produced by cross-linking polymerization of the unsaturated monomer containing acrylic acid (salt), and by drying the resultant polymer.

Amount of acrylic acid (salt) contained in the unsaturated monomer can be adjusted as appropriate, depending on number of repeating units derived from acrylic acid (salt) contained in the objective polyacrylic acid (salt)-based water absorbent resin, however, it is preferably from 10 to 100% by mole, more preferably from 50 to 100% by mole, still more preferably from 70 to 100% by mole, and particularly preferably from 90 to 100% by mole, relative to total mole number of the unsaturated monomer.

It is preferable to add a polymerization inhibitor into acrylic acid (salt). As the polymerization inhibitor, a conventionally known one can be use as appropriate, and among them, it is preferable to be methoxyphenols, and more preferable to be p-methoxyphenol. In the case where methoxyphenols are used as the polymerization inhibitor, use amount thereof is preferably from 10 to 200 ppm by mass, more preferably from 10 to 90 ppm by mass, and still more preferably from 20 to 90 ppm by mass, relative to total mass of acrylic acid (salt).

A method for cross-linking is not especially limited, and includes, for example, a method for polymerization by adding, in advance, predetermined amount of an internal cross-linking agent into a monomer, and by performing a cross-linking reaction at the same time of polymerization or after polymerization; a method for adding a cross-linking agent during polymerization or after polymerization to perform post cross-linking; a method for performing radical cross-linking by a radical polymerization initiator; and a method for performing radiation cross-linking by electron beams or the like. Among these, it is preferable to be a method for polymerization by adding, in advance, predetermined amount of an internal cross-linking agent into a monomer, and by performing a cross-linking reaction at the same time of polymerization or after polymerization.

The internal cross-linking agent is not especially limited, and includes, for example, a polymerizable internal cross-linking agent such as N,N'-methylenebisacrylamide, (poly) ethylene glycol di(meth) acrylate, (poly) propylene glycol di(meth)acrylate, (polyoxyethylene) trimethylolpropane tri (meth)acrylate, trimethylolpropane di(meth) acrylate, and a poly(meth) allyloxyalkane; and an internal cross-linking agent reactive with a carboxyl group, for example, such as polyglycidyl ether (for example, ethylene glycol diglycidyl ether or the like), polyol (for example, ethylene glycol, polyethylene glycol, glycerin, sorbitol or the like), and an alkylene carbonate (for example, ethylene carbonate or the like), and they may be used alone or two or more kinds in combination. Among these, in view of water absorbing characteristics of the water absorbent agent, a polymerizable internal cross-linking agent is preferably used.

Use amount of the internal cross-linking agent can be adjusted as appropriate, however, in view of property, it is preferably from 0 to 3% by mole, more preferably from 0.0001 to 2% by mole, still more preferably from 0.005 to 1.5% by mole, and particularly preferably from 0.01 to 1.0% by mole, relative to total mole number of the unsaturated monomer.

In the case of performing reversed-phase suspension polymerization or aqueous solution polymerization in the polymerization step, acrylic acid and the unsaturated monomer is used as an aqueous solution containing the internal cross-linking agent, if necessary, and concentration of the unsaturated monomer component in the relevant aqueous solution (hereafter may also be referred to as "monomer aqueous solution") is, in view of physical property, preferably from 10 to 70% by mass, more preferably from 15 to 65% by mass, still more preferably from 30 to 65% by mass, particularly preferably from 30 to 60% by mass, and most preferably from 35 to 55% by mass, relative to total mass of the aqueous solution. It should be noted that, a solvent other than water may be used in combination, if necessary, and the solvent type is not especially limited, as long as it is one not to give significantly adverse effect on the polymerization reaction.

In the case of mixing the chelating agent to the monomer aqueous solution, the mixing method is not especially limited, however, preferably the unsaturated monomer aqueous solution is prepared by adding and mixing it into the monomer or the monomer aqueous solution.

Further, in polymerization, a water-soluble resin such as polyvinyl alcohol, starch, polyacrylic acid (salt), or the water absorbent resin can be added as well. The addition amount of the water-soluble resin or the water absorbent resin is preferably from 0 to 50% by mass, and more preferably from 0 to 20% by mass, relative to total mass of the unsaturated monomer. In addition, various foaming agents such as a carbonate salt, an azo compound, air bubbles; a surfactant; or other additives may be added as appropriate. The addition amount of these is preferably from 0 to 5% by mass, and more preferably from 0 to 1% by mass, relative to total mass of the unsaturated monomer. By the addition of these components, various properties of the water absorbent resin or the water absorbent resin composition can be improved.

The polymerization method is not especially limited, however, in view of performance or easiness of polymerization control, and polymerization is preferably performed by aqueous solution polymerization or reversed-phase suspension polymerization. These polymerizations can be performed under air atmosphere, however, it is preferable to be performed under inert gas atmosphere of nitrogen or argon or the like (for example, under an oxygen concentration of equal to or lower than 1%). In addition, the monomer component is used in polymerization, after dissolved oxygen thereof is sufficiently replaced with inert gas (for example, under an oxygen concentration of equal to or lower than 1 ppm). In the present invention, aqueous solution polymerization can be used suitably, which provides high productivity and high property, but on the other hand was difficult in polymerization control. Preferable aqueous solution polymerization includes continuous belt polymerization, and continuous or batch kneader polymerization.

It should be noted that, reversed-phase suspension polymerization is a polymerization method where the monomer aqueous solution is suspended in a hydrophobic organic solvent, and it is described, for example, in U.S. Pat. Nos. 4,093,776, 4,367,323, 4,446,261, 4,683,274 and 5,244,735 or the like. Aqueous solution polymerization is a method for polymerizing the monomer aqueous solution without using a dispersing solvent, and it is described, for example, in U.S. Pat. Nos. 4,625,001, 4,873,299, 4,286,082, 4,973,632, 4,985,518, 5,124,416, 5,250,640, 5,264,495, 5,145,906, 5,380,808, EP-A-0811636, EP-A-0955086, EP-A-0922717 and EP-A-1178059 or the like. A monomer, a cross-linking agent, a polymerization initiator and other additives described in these can be applied to the present invention as well.

The polymerization initiator to be use in polymerization includes, for example, persulfate such as potassium persulfate, ammonium persulfate, and sodium persulfate; t-butyl-hydroperoxide, hydrogen peroxide, 2,2'-azobis(2-amidinopropane) dihydrochloride, 2-hydroxy-1-phenyl-propane-1-one, and benzoin methyl ether or the like. Further, it is exemplified to use in combination a reducing agent such as L-ascorbic acid, which promotes decomposition of these polymerization initiators, to make a redox-based initiator etc. by combination of these. Use amount of these polymerization initiators is preferably from 0.001 to 1% by mole, and more preferably from 0.001 to 0.5% by mole, relative to total mole number of the monomer.

In addition, a polymerization reaction may be performed by irradiation of active energy rays such as radiation, electron beams or UV rays to a reaction system, instead of using the polymerization initiator. Further, the active energy rays and a polymerization initiator which sensitizes the active energy rays may be used in combination, or the active energy rays and the above usual polymerization initiator may be used in combination.

Reaction temperature or reaction time in the polymerization reaction is not especially limited, however, it can be determined as appropriate according to the monomer or the polymerization initiator type. Peak temperature of the reaction is usually equal to or lower than boiling temperature of the monomer aqueous solution, and is preferably equal to or lower than 150° C., and more preferably from 90 to 120° C. The reaction time is preferably within 3 hours, more preferably within 1 hour, still more preferably within 0.5 hour. It is preferable that water or acrylic acid, which evaporates during polymerization, is captured, if necessary, and further recycled to the production step of the water absorbent resin.

As a preferable production method, the chelating agent is mixed to the monomer aqueous solution in polymerization. It should be noted that, the monomer aqueous solution in polymerization is not limited to the monomer aqueous solution before polymerization, and it is a concept encompassing the monomer aqueous solution in the midst of polymerization or a gel-like substance containing the relevant aqueous solution, and it may be mixed at any timing of before or after charging the polymerization initiator, and the timing of the mixing or the mixing method should not be limited especially.

A cross-linked polymer (hereafter referred to also as "water-containing gel") obtained by the above polymerization reaction is obtained in a water-containing gel state. In the case of aqueous solution polymerization, it may be dried as it is, however, if necessary, it is ground to a particle state by using a gel grinding machine or the like. It is preferable that the water-containing gel in gel grinding is kept warmed or heated, and temperature of the water-containing gel in this case is preferably, in view of physical property, from 40 to 95° C., and still more preferably from 50 to 80° C.

Solid content of the water absorbent resin contained in the water-containing gel is not especially limited, however, in view of physical property, it is preferably from 10 to 70% by mass, more preferably from 15 to 65% by mass, and still more preferably from 30 to 55% by mass, relative to total mass of the water-containing gel.

Gel grinding is performed in polymerization or after polymerization, and preferably gel is ground by extruding from a continuous kneader or a porous structure. Pore diameter in this case is preferably from 0.3 to 20 mm, more preferably from 0.5 to 10 mm, and still more preferably from 0.5 to 5.0 mm. Pore shape is not especially limited, and includes circle, quadrangle such as square or rectangle, triangle, along with hexagon or the like, and it is preferable to be a circle shaped hole. It should be noted that, the above pore diameter is determined as diameter when outer circumference of the sieve mesh size part is converted to outer circumference of a circle. The pore diameter of the porous structure of equal to or larger than 0.3 mm is capable of grinding the gel without generating string-like gel, and extruding gel easily as well. On the other hand, the pore diameter of the porous structure of equal to or smaller than 20 mm has no risk of giving adverse effect on absorbing characteristics of the water absorbent resin composition.

As an extrusion grinding apparatus, for example, a type, which is capable of sending the water-containing gel under pressure from a supply port thereof to a porous plate, is used, such as a screw-type, a rotation roll-type. The screw-type extruder may have a single-axis or a multi-axis, and usually may be one to be used in extrusion molding of meat, rubber or plastics, or one to be used as a grinding machine. For example, a meat chopper or dome granulator or the like is included.

It is preferable that the water-containing gel, after drying, is adjusted to have specific particle size to enhance property in a surface cross-linking to be described later. The adjustment method is not especially limited, and the adjustment is performed by grinding, classification, granulation, micro powder recovery or the like. It should be noted that, by adjusting the polymerization reaction such as reversed-phase suspension polymerization as well, it is possible to adjust particle size.

It is preferable that the water absorbent resin is further subjected to the surface cross-linking. The "surface cross-linking" in the present invention means to perform cross-linking at a part of a surface layer (surface vicinity: at the vicinity of usually equal to or less than several 10 μm) of the water absorbent resin, to furnish the relevant part high cross-link density. A method for the surface cross-linking is not especially limited, and a highly cross-linked layer may be formed by radical cross-linking at the surface, or surface polymerization, or the surface cross-linking may be performed by a cross-linking reaction with the surface cross-linking agent.

As the surface cross-linking agent, various organic cross-linking agents or inorganic cross-linking agents can be used, however, in view of physical property, it is preferable to be a cross-linking agent which is capable of reacting with a carboxyl group. For example, there can be used an organic surface cross-linking agent such as a polyhydric alcohol compound, an epoxy compound, a polyvalent amine compound, or a condensate between these compounds and a halo-epoxy compound; an oxazoline compound, a mono, di, or polyoxazolidinone compound, a polyvalent metal salt, an alkylene carbonate compound.

A specific surface cross-linking agent is exemplified in U.S. Pat. Nos. 6,228,930, 6,071,976 and 6,254,990 or the like. For example, there are included a polyhydric alcohol compound such as mono, di, tri, tetra, or polyethylene glycol, mono propylene glycol, 1,3-propanediol, dipropylene glycol, 2,3,4-trimethyl-1,3-pentanediol, polypropylene glycol, glycerin, polyglycerin, 2-butene-1,4-diol, 1,4-butanediol, 1,3-butanediol, 1,5-pentanediol, 1,6-hexanediol, and 1,2-cyclohexanedimethanol; an epoxy compound such as ethylene glycol diglycidyl ether and glycidol; a polyvalent amine compound such as ethylenediamine, diethylenetriamine, triethylenetetramine, tetraethylenepentamine, pentaethylenehexamine, polyethyleneimine, and polyamide polyamine; a halo-epoxy compound such as epichlorohydrin, epibromohydrin, and α-methylepichlorohydrin; a condensate between the above-described polyvalent amine compound and the above-described halo-epoxy compound; an oxazolidinone compound such as 2-oxazolidinone; an alkylene carbonate compound such as ethylene carbonate, however, it is not limited thereto. Among such a surface cross-linking agent, use of at least the polyhydric alcohol is preferable and number of the carbon atom of the polyhydric alcohol is preferably from 2 to 10, and more preferably from 3 to 8.

Use amount of the surface cross-linking agent depends on a compound for use or a combination thereof, however, it is preferably from 0.001 to 10 parts by mass, and more preferably from 0.01 to 5 parts by mass, relative to 100 parts by mass of solid content of the water absorbent resin. In addition, in the surface cross-linking reaction, use of water is preferable. Amount of water for use in this case depends on water content of the water absorbent resin for use, however, it is preferably from 0.5 to 20 parts by mass, and more preferably from 0.5 to 10 parts by mass, relative to 100 parts by mass of the water absorbent resin.

In addition, in the surface cross-linking, a hydrophilic organic solvent may be used other than water. Use amount of the hydrophilic organic solvent is preferably from 0 to 10 parts by mass, more preferably from 0 to 5 parts by mass, and still more preferably from 0 to 3 parts by mass, relative to 100 parts by mass of the water absorbent resin. Temperature of an aqueous solution of the cross-linking agent in the surface cross-linking, in view of mixing property or stability, is preferably from 0° C. to boiling point of the aqueous solution of the cross-linking agent, more preferably from 5 to 50° C., and still more preferably from 10 to 30° C. In addition, temperature of the water absorbent resin before mixing, in view of mixing property, is preferably from 0 to 80° C., and more preferably from 40 to 70° C. It should be noted that, in the surface cross-linking, the additives described in U.S. Pat. Nos. 5,610,208 and 5,610,220 may be used further.

In performing the surface cross-linking, it is preferable that water and/or the hydrophilic organic solvent are mixed in advance, if necessary, and then the aqueous solution is sprayed or mixed by dropping to the water absorbent resin, and more preferably sprayed. Average diameter of a droplet to be sprayed is preferably from 1 to 300 μm, and more preferably from 10 to 200 μm. In addition, in the mixing, the above inorganic powder or organic powder, or surfactant may be present together within a range not to inhibit effect of the present invention. Amount of the water-insoluble micro powder or surfactant is preferably from 0 to 10% by mass, more preferably from 0 to 5% by mass, and still more preferably from 0 to 1% by mass, relative to total mass of the water absorbent resin. In addition, if necessary, a surfactant may be used, and the surfactant type or use amount thereof is exemplified in WO2005/75070.

A mixing apparatus for use in mixing in the surface cross-linking requires to generate large mixing force to ensure uniform mixing. As such an apparatus, a high speed stirring-type mixing apparatus is included, and it is more preferable to be a high speed stirring-type continuous mixing apparatus. As the high speed stirring-type continuous mixing apparatus, for example, "Turbulizer" (manufactured by Hosokawa micron Group.) or "Roedige mixer" (manufactured by Roedige Gmbh., Ltd.) or the like can be used suitably.

It is preferable that the water absorbent resin is subjected to heat treatment after mixing the surface cross-linking agent. Heating temperature for performing the heat treatment is preferably from 120 to 250° C., and more preferably from 150 to 250° C. In addition, heating time is preferably from 1 minute to 2 hours. The heat treatment can be performed by using a usual dryer or a heating furnace. As the dryer, for example, a groove-type mixing dryer, a rotary dryer, a disc dryer, a fluidized bed dryer, a flash dryer, and an infrared ray dryer or the like is included. In addition, the water absorbent resin after heating may be cooled if necessary, and as the cooling method, a method disclosed in US-A-2004/181031 or the like is exemplified.

It should be noted that, these surface cross-linking methods are described in EP-A-0349240, EP-A-0605150, EP-A-0450923, EP-A-0812873, EP-A-0450924, EP-A-0668080, JP-A-07 (1995)-242709, JP-A-07 (1995)-224304, U.S. Pat. Nos. 5,409,771, 5,597,873, 5,385,983, 5,610,220, 5,633,316, 5,674,633, 5,462,972, WO99/42494, WO99/43720 and WO99/42496, and these surface cross-linking methods also can be applied to the present invention.

It is preferable that the water absorbent resin is surface treated by using the above polyvalent metal salt, if necessary. In particular, by using the polyvalent metal salt and the organic surface cross-linking agent in combination, superior water absorbing characteristics can be attained.

It should be noted that, a method and condition and the like of the surface treatment with the polyvalent metal salt are described in WO2004/069915, WO2004/113452 and WO2005/108472, and these methods can be adopted as appropriate.

(Addition of a Deodorant Component and an Antimicrobial Component)

In producing the water absorbent resin composition relevant to the first aspect, the extract of bamboo and the extract of tea can be added and mixed at any one or more steps of the above production steps. Among these, it is preferable that the extract of bamboo and the extract of tea are added and mixed at one or more steps among the steps of particle size adjustment after polymerizing the unsaturated monomer, namely, after drying the water-containing gel, surface fabrication, surface treatment with the polyvalent metal salt, and particle size adjustment. Further, in view of exerting deodorant and antimicrobial performance sufficiently, it is preferable to add and mix the extract of bamboo and the extract of tea, after the surface cross-linking step, and for example, a method disclosed in US-A-2004/181031 can be adopted. It should be noted that, order of the addition of the extract of bamboo and the extract of tea is not especially limited, and the extract of bamboo or the extract of tea may be added each at the separate step, or both of them may naturally be added at the same step.

The extract of bamboo and the extract of tea may be added as a powder or stock solution as it is, or can be added in a form of a solution by diluting this with water or a hydrophilic organic solvent such as alcohol, ether, however, it is preferable to be added in a form of the latter solution. It should be noted that, as the preferable addition amount of the extract of bamboo and the extract of tea, similar value as preferable content of the extract of bamboo and the extract of tea, in explanation of the above water absorbent resin composition, can be adopted.

Temperature in adding the extract of bamboo and the extract of tea is, in view of preventing decomposition or volatilization or transpiration of the effective components, preferably equal to or lower than 160° C., more preferably equal to or lower than 100° C., and still more preferably equal to or lower than 80° C. It should be noted that, the lower limit value of the temperature is not especially limited, however, in view of productivity, it is preferably equal to or higher than 50° C., and more preferably equal to or higher than 60° C.

In addition, in adding and mixing the extract of bamboo and the extract of tea, an apparatus exemplified in the above surface cross-linking production step, or the like can be used.

In producing the water absorbent resin composition relevant to the second aspect, as the method for adding at least two kinds of compounds selected from a group consisting of hexanoic acid (salt), ethyl butyrate, and 3-methyl-2-cyclopenten-1-one, as well, a similar method for adding the extract of bamboo and the extract of tea in the above first aspect can be adopted, therefore, detailed explanation is omitted here.

It should be noted that, apart from this, as the third aspect of the present invention, there is included a method for producing the water absorbent resin composition, where an alcoholic solution of the extract of bamboo is added before polymerization or after polymerization of the unsaturated monomer having acrylic acid (salt) as a main component. Use of the relevant method provides desired deodorant effect and antimicrobial effect, without adding the extract of tea. In the case of adding the alcoholic solution of the extract of bamboo to the unsaturated monomer, it is considered that the extract of bamboo is stabilized by interaction with the alcohol in the monomer, and prevents denaturing and deterioration of the effective components, and exerts significant deodorant effect and antimicrobial effect. In addition, in the case of adding the alcoholic solution of the extract of bamboo, after polymerization of the unsaturated monomer, it is considered that because of localization of the extract of bamboo at the vicinity of the surface of the resin formed by polymerization, significant effect can be exerted.

The water absorbent resin composition obtained by the third aspect contains the water absorbent resin having the polyacrylic acid (salt)-based water absorbent resin as a main component, and the extract of bamboo and an alcohol. As each of the structural components such as the water absorbent resin, the extract of bamboo to be contained in the relevant water absorbent resin composition, similar one as described in explanation on the structural components of the water absorbent resin composition of the above first aspect and the second aspect can be used without limitation. In addition, it is also similar, as for preferable content of each of the structural components.

The alcohol to be used in the alcoholic solution is not especially limited, however, it is preferably an alcohol having number of carbon atoms of from 1 to 6, more preferably number of carbon atoms of from 1 to 4, and still more preferably a saturated hydrocarbon-based mono-alcohol or a poly-alcohol having number of carbon atoms of from 2 to 4. Specifically, it is preferable to use methanol, ethanol, butanol, isobutanol, 2-propanol, isobutanol, tert-butanol, methanediol, ethanediol, 1,2-propanediol, 1,3-propanediol, glycerin, and ethylene glycol. Among these, it is preferable to use ethanol, 2-propanol, 1,2-propanediol, 1,3-propanediol, and glycerin. It should be noted that, the solution can be prepared by using a mixed solvent added with water as appropriate, other than the alcohol.

Concentration of the extract of bamboo in the alcoholic solution is preferably from 1 to 99% by mass, more preferably from 20 to 80% by mass, and still more preferably from 30 to 70% by mass, relative to total mass of the alcoholic solution. By adding the alcoholic solution in such concentration, the deodorant effect and antimicrobial effect can be enhanced.

As for the addition method and temperature of the addition, similar condition of the addition in the first aspect and the second aspect can be used, and thus explanation here is omitted.

It should be noted that, in adding the extract of bamboo and the extract of tea in the first aspect, or in adding at least two kinds of compounds selected from a group consisting of hexanoic acid (salt), ethyl butyrate, and 3-methyl-2-cyclopenten-1-one, in the second aspect as well, it is preferable to add as the alcoholic solution, similarly as in the third aspect. In particular, in adding hexanoic acid (salt), ethyl butyrate, and 3-methyl-2-cyclopenten-1-one, in view of solubility of each component, it is preferable to be the alcohol solvent or a mixed solvent of an alcohol and water. In view of general purpose and safety, it is more preferable to be ethanol or a mixed solvent of ethanol and water. As for mixing ratio of the mixed solvent, it is not especially limited, as long as at least two kinds of compounds selected from a group consisting of hexanoic acid (salt), ethyl butyrate, and 3-methyl-2-cyclopenten-1-one are completely dissolved, however, ratio of the alcohol/water is preferably from 1/99 to 50/50, more preferably from 1/99 to 40/60, still more preferably from 5/95 to 40/60, and particularly preferably from 10/90 to 30/70.

(Adjustment of Particle Size)

The water absorbent resin composition may be subjected to operations, as appropriate, such as the particle size adjustment step, the granulation step, the micro powder recovery step or the like, if necessary, to adjust to predetermined particle size. It should be noted that, as the adjustment step to predetermined particle size, for example, the step described in US-A-2004/181031, US-A-2004/242761 and US-A-2006/247351 or the like can be adopted.

[Absorbent Articles]

Applications of the water absorbent resin composition relevant to the present invention are not especially limited, and preferably, it is used in absorbent articles such as a disposable diaper, a sanitary napkin and an incontinent pad. In particular, it is preferable to be used in a high concentration diaper (one where a large quantity of the water absorbent resin is used in one sheet of a diaper), and further it is more preferable to be used at the upper layer part of the absorbent material in the absorbent articles. Use of a conventional water absorbent resin composition in such absorbent articles has raised a problem of odor or coloring or the like derived from a raw material, however, according to the water absorbent resin composition of the present invention, such a problem can be solved.

The absorbent articles relevant to the present invention contains essentially the water absorbent resin composition relevant to the present invention, and is provided with the absorbent material obtained by making the hydrophilic fiber to a sheet-like form, a surface sheet having liquid permeability and a back sheet having liquid non-permeability, if necessary. The absorbent material in the case of not using the hydrophilic fiber is constituted by fixing a particular water absorbent agent in paper and/or unwoven fabric. In addition, in the case of using a fiber material (pulp), it is formed by sandwiching or blending. As a fiber substrate, for example, there is included hydrophilic fiber such as ground wood pulp, cotton linter and cross-linked cellulose fiber, rayon, cotton, wool, acetate and vinylon, and among these, use of an airlaid fiber material is preferable.

Content (core concentration) of the water absorbent resin composition in the absorbent material in these absorbent articles is usually from 30 to 100% by mass, preferably from 40 to 100% by mass, more preferably from 50 to 100% by mass, still more preferably from 60 to 100% by mass, particularly preferably from 70 to 100% by mass, and most preferably from 75 to 95% by mass. By containing the water absorbent resin composition in such amount, effect of the present invention is exerted still more significantly. For example, in the case where the water absorbent resin composition is used in the above content, in particular, at the upper layer part of the absorbent material, because of high liquid permeability (liquid permeability against pressure) and superior diffusion property of absorbed liquid such as urine, there can be provided the absorbent articles, maintaining a white state showing sanitary feeling of the absorbent material, as well as having enhanced absorbing amount of the absorbent articles in total, owing to efficient liquid distribution by the absorbent articles such as a disposable diaper.

In addition, it is preferable that the above absorbent material is compression molded so as to have a density of from 0.06 g/cc to 0.50 g/cc, and a basis weight of from 0.01 g/cm$^2$ to 0.20 g/cm$^2$. Further, thickness of the above absorbent material is equal to or less than 30 mm, and preferably equal to or less than 20 mm, and thus the absorbent articles suitable for a thin-type disposable diaper can be provided.

EXAMPLES

Explanation will be given below on operation/effect of the present invention with reference to Examples and Comparative Examples. However, the technical scope of the present invention should not be limited only to the following Examples. It should be noted that, physical property values described in the present description were measured by the following measurement methods. Although the following measurement methods are described as the measurement methods for the water absorbent resin composition, also the water absorbent resin can be measured using similar methods. Mass and weight are synonyms, and for example, ppm by mass and ppm by weight are synonymous.

Production of the Water Absorbent Resin

Production Example 1

Into a reactor formed by attaching a cover to a stainless double-arm-type 10-L kneader, equipped with a jacket and having two sigma-type blades, 425.2 g of acrylic acid, 4499.5 g of a 37% by mass aqueous solution of sodium acrylate, 538.5 g of pure water, 6.17 g of polyethylene glycol diacrylate (a molecular weight of 523) and 0.21 g of trisodium diethylenetriamine pentaacetate were dissolved to prepare a reaction solution. Then, this reaction solution was deaerated under nitrogen gas atmosphere for 20 minutes. Subsequently, 28.3 g of a 10% by mass aqueous solution of sodium persulfate and 23.6 g of a 0.1% by mass aqueous solution of L-ascorbic acid were added to this reaction solution under stirring, and polymerization initiated after about 25 seconds. Then, under grinding the gel generated, polymerization was performed at from 25° C. to 95° C., and after 30 minutes from initiation of polymerization, a water-containing gel-like cross-linked polymer was taken out. The resultant water-containing gel-like cross-linked polymer was minced to a diameter thereof of equal to or smaller than about 5 mm.

This minced water-containing gel-like cross-linked polymer was spread on a 50-mesh metal screen to be subjected to hot air drying at 170° C. for 65 minutes; and the dried substance was ground using a roll mill, and classified and blended with a JIS standard sieve with a sieve mesh size of 850 μm, to obtain an irregularly ground water absorbent resin particle (1-a) having the mass average particle diameter (D50) of 458 μm, and the logarithm standard deviation (σζ) of particle size distribution of 0.40. The centrifuge retention capacity (CRC) of the water absorbent resin particle was 42 (g/g) and the amount of water-soluble portions was 13% by mass.

To 100 parts by mass of the resultant water absorbent resin particle (1-a), a surface cross-linking agent, composed of mixed liquid of 0.35 part by mass of 1,4-butanediol, 0.55 part by mass of propylene glycol, and 3.0 parts by mass of pure water, was uniformly mixed and then the mixture was heat treated at 212° C. for 40 minutes. After that, the resultant particle was ground till it passed through the JIS standard sieve with a sieve mesh size of 850 μm to obtain a surface cross-linked water absorbent resin particle (1).

Production Example 2

Into a reactor formed by attaching a cover to a stainless double-arm-type 10-L kneader, equipped with a jacket and having two sigma-type blades, 425.2 g of acrylic acid, 4499.5 g of a 37% by mass aqueous solution of sodium acrylate, 518.5 g of pure water, and 4.94 g of polyethylene glycol diacrylate (a molecular weight of 523) were dissolved to prepare a reaction solution. Then, this reaction solution was deaerated under nitrogen gas atmosphere for 20 minutes. Subsequently, 28.3 g of a 10% by mass aqueous solution of sodium persulfate and 23.6 g of a 0.1% by mass aqueous solution of L-ascorbic acid were added to this reaction solution under stirring, and polymerization initiated after about 25 seconds. Then, under grinding the gel generated, polymerization was performed at from 25° C. to 95° C., and after 30 minutes from initiation of polymerization, a water-containing gel-like cross-linked polymer was taken out. The resultant water-containing gel-like cross-linked polymer was finely ground to a diameter thereof of equal to or smaller than about 5 mm.

This minced water-containing gel-like cross-linked polymer was spread on a 50-mesh metal screen to be subjected to hot air drying at 180° C. for 50 minutes; and the dried substance was ground using a roll mill, and classified and blended with a JIS standard sieve with a sieve mesh size of 850 μm, to obtain an irregularly ground water absorbent resin particle (2-a) having the mass average particle diameter (D50) of 350 μm, and the logarithm standard deviation (σζ) of particle size distribution of 0.35. The centrifuge retention capacity (CRC) of the water absorbent resin particle (2-a) was 44 (g/g) and the amount of water-soluble portions was 15% by mass.

To 100 parts by mass of the resultant water absorbent resin particle (2-a), a surface cross-linking agent, composed of mixed liquid of 0.35 part by mass of 1,4-butanediol, 0.55 part by mass of propylene glycol, and 3.0 parts by mass of pure water, was uniformly mixed and then the mixture was heat treated at 212° C. for 40 minutes. After that, the resultant particle was ground till it passed through the JIS standard sieve with a sieve mesh size of 850 μm to obtain a surface cross-linked water absorbent resin particle (2). It should be noted that, the resultant water absorbent resin particle (2) had the mass average particle diameter (D50) of 352 μm, a ratio of particles passed through a 150-μm sieve of 3.3% by mass, and the logarithm standard deviation (σζ) of particle size distribution of 0.34.

Production Example 3

Into a reactor formed by attaching a cover to a stainless double-arm-type 10-L kneader, equipped with a jacket and having two sigma-type blades, 425.2 g of acrylic acid, 4499.5 g of a 37% by mass aqueous solution of sodium acrylate, 517.2 g of pure water, and 6.17 g of polyethylene glycol diacrylate (a molecular weight of 523) were dissolved to prepare a reaction solution. Then, this reaction solution was deaerated under nitrogen gas atmosphere for 20 minutes. Subsequently, 28.3 g of a 10% by mass aqueous solution of sodium persulfate and 23.6 g of a 0.1% by mass aqueous solution of L-ascorbic acid were added to this reaction solution under stirring, and polymerization initiated after about 25 seconds. Then, under grinding the generated gel, polymerization was performed at from 25° C. to 95° C., and after 30 minutes from initiation of polymerization, a water-containing gel-like cross-linked polymer was taken out. The resultant water-containing gel-like cross-linked polymer was minced to a diameter thereof of equal to or smaller than about 5 mm.

This minced water-containing gel-like cross-linked polymer was spread on a 50-mesh metal screen to be subjected to hot air drying at 180° C. for 50 minutes; and the dried substance was ground using a roll mill, and classified and blended with a JIS standard sieve with a sieve mesh size of 850 μm, to obtain an irregularly ground water absorbent resin particle (3-a) having the mass average particle diameter (D50) of 450 μm, and the logarithm standard deviation (σζ) of particle size distribution of 0.38. The centrifuge retention capacity (CRC) of the water absorbent resin particle (3-a) was 39 (g/g) and the amount of water-soluble portions was 11% by mass.

To 100 parts by mass of the resultant water absorbent resin particle (3-a), a surface cross-linking agent composed of mixed liquid of 0.35 part by mass of 1,4-butanediol, 0.55 part by mass of propylene glycol, and 3.0 parts by mass of pure water, was uniformly mixed and then the mixture was heat treated at 212° C. for 35 minutes. After that, the resultant particle was crushed till it passed through the JIS standard sieve with a sieve mesh size of 850 μm to obtain a surface cross-linked water absorbent resin particle (3). It should be noted that, the resultant water absorbent resin particle (3) had the mass average particle diameter (D50) of 470 μm, a ratio of particles passed through a 150-μm sieve of 2.2% by mass, and the logarithm standard deviation (σζ) of particle size distribution of 0.38.

Preparation of the Water Absorbent Resin Composition

Example 1

To 100 parts by mass of the water absorbent resin particle (1) obtained in Production Example 1, 0.5 part by mass of a solution, where 0.5% by mass of an extract solution of bamboo (trade name: Neobamboos-2000, sold by Shiraimatsu Pharmaceutical Co., Ltd.) was added to a solution of an extract of tea leaves of Theaceae plant (trade name: FS-80MO, sold by Shiraimatsu Pharmaceutical Co., Ltd.), was added and mixed, and after making stood still in a sealed non-air blow-type drier at 60° C. for 1 hour, it was passed through the JIS standard sieve with a sieve mesh size of 850 μm to obtain the water absorbent resin composition (1).

Example 2

By performing similar operation as in Example 1 except that 0.25 part by mass of a solution, where 0.5% by mass of the extract solution of bamboo was added to the extract solution of tea leaves of Theaceae plant, was added, the water absorbent resin composition (2) was obtained.

Example 3

To 100 parts by mass of the water absorbent resin particle (1) obtained in Production Example 1, 2.05 parts by mass of a solution (a mixed aqueous solution of the extract of bamboo and the extract of tea leaves) was added and mixed, which solution was obtained by mixing 0.05 part by mass of a solution, where 0.5% by mass of an extract solution of bamboo (trade name: Neobamboos-2000, sold by Shiraimatsu Pharmaceutical Co., Ltd.) was added to a solution of an extract of tea leaves of Theaceae plant (trade name: FS-80MO, soled by Shiraimatsu Pharmaceutical Co., Ltd.), and 2.0 parts by mass of water, and after making stood still in a sealed non-air blow-type drier at 60° C. for 1 hour, it was passed through the JIS standard sieve with a sieve mesh size of 850 μm to obtain the water absorbent resin composition (3).

Example 4

By performing similar operation as in Example 3 except that 0.1 part by mass of a solution, where 0.5% by mass of the extract solution of bamboo was added to the extract solution of tea leaves of Theaceae plant, was added, the water absorbent resin composition (4) was obtained.

Example 5

By performing similar operation as in Example 3 except that 0.2 part by mass of a solution, where 0.5% by mass of the extract solution of bamboo was added to the extract solution of tea leaves of Theaceae plant, was added, the water absorbent resin composition (5) was obtained.

Example 6

To 100 parts by mass of the water absorbent resin particle (2) obtained in Production Example 2, 2.512 parts by mass of a solution was added and mixed, which solution was obtained by mixing 0.5 part by mass of a solution, where 0.5% by mass of an extract solution of bamboo (trade name: Neobamboos-2000, sold by Shiraimatsu Pharmaceutical Co., Ltd.) was added to a solution of an extract of tea leaves of Theaceae plant (trade name: FS-80MO, sold by Shiraimatsu Pharmaceutical Co., Ltd.), 0.01 part by mass of trisodium diethylenetriamine pentaacetate, 0.002 part by mass of polyoxyethylene (20) sorbitan monostearate (trade name: Rheodol TW-S120V, sold by Kao corp.), and 2.0 parts by mass of water, and after making stood still in a sealed non-air blow-type drier at 60° C. for 1 hour, it was passed through the JIS standard sieve with a sieve mesh size of 850 μm to obtain the water absorbent resin composition (6).

Example 7

By performing similar operation as in Example 6 except that 0.1 part by mass of a solution, where 0.5% by mass of the extract solution of bamboo was added to the extract solution of tea leaves of Theaceae plant, was added, the water absorbent resin composition (7) was obtained.

Example 8

By performing similar operation as in Example 6 except that 0.7 part by mass of a solution, where 0.5% by mass of the extract solution of bamboo was added to the extract solution of tea leaves of Theaceae plant, was added to 100 parts by mass of the water absorbent resin (3) obtained in Production Example 3, the water absorbent resin composition (8) was obtained.

Example 9

To 100 parts by mass of the water absorbent resin particle (1) obtained in Production Example 1, 2.2 parts by mass of a solution (a mixed aqueous solution of the extract of bamboo and the extract of tea leaves) was added and mixed, which solution was obtained by adding 5.0% by mass the extract solution of bamboo (trade name: Neobamboos-2000, sold by Shiraimatsu Pharmaceutical Co., Ltd.) to the solution of the extract of tea leaves of Theaceae plant (trade name: FS-80MO, produced by Shiraimatsu Pharmaceutical Co., Ltd.), and after making stood still in a sealed non-air blow-type drier at 60° C. for 1 hour, it was passed through the JIS standard sieve with a sieve mesh size of 850 μm to obtain the water absorbent resin composition (9).

Example 10

To 100 parts by mass of the water absorbent resin particle (1) obtained in Production Example 1, 2.2 parts by mass of a solution (a mixed aqueous solution of the extract of bamboo and the extract of tea leaves) was added and mixed, which solution was obtained by mixing 0.2 part by mass of a solution, where 50% by mass of the extract solution of bamboo (trade name: Neobamboos-2000, sold by Shiraimatsu Pharmaceutical Co., Ltd.) was added to the solution of the extract of tea leaves of Theaceae plant (trade name: FS-80MO, sold by Shiraimatsu Pharmaceutical Co., Ltd.), and 2.0 part by mass of water, and after making stood still in a sealed non-air blow-type drier at 60° C. for 1 hour, it was passed through the JIS standard sieve with a sieve mesh size of 850 μm to obtain the water absorbent resin composition (10).

Example 11

By performing similar operation as in Example 10 except that 2.0 parts by mass of a solution, where 50% by mass of the extract solution of bamboo was added to the extract solution of tea leaves of Theaceae plant, was added, the water absorbent resin composition (11) was obtained.

To 100 parts by mass of the water absorbent resin particle (1) obtained in Production Example 1, a solution was added and mixed, which solution was obtained by mixing 0.05 part by mass of the dry distillation extract of bamboo, 0.02 part by mass of the dry distillation extract of tea, and 2 parts by mass of water, and after making stood still in a sealed non-air blow-type drier at 60° C. for 1 hour, it was passed through the JIS standard sieve with a sieve mesh size of 850 μm to obtain the water absorbent resin composition (12).

It should be noted that the dry distillation extract of bamboo used in Example was obtained by supplying a ground product of bamboo (Phyllostachys pubescens) to a dry distillation apparatus under reduced pressure, and by performing dry distillation under reduced pressure under condition of a pressure of about 20 mmHg and a temperature of about 300° C. In addition, the dry distillation extract of tea was obtained by supplying a powder of tea leaves to a dry distillation apparatus under reduced pressure, and by performing dry distillation under reduced pressure under condition of a pressure of about 20 mmHg and a temperature of about 200° C.

Example 13

To 100 parts by mass of the water absorbent resin particle (1) obtained in Production Example 1, 2.0120003 parts by mass of a solution was added and mixed, which solution was obtained by mixing 1 ppb by mass of hexanoic acid (CAS-No. 142-62-1, produced by Wako Pure Chemical Industries, Ltd.), 1 ppb by mass of ethyl butyrate (CAS-No. 105-54-4, produced by Wako Pure Chemical Industries, Ltd.), 1 ppb by mass of 3-methyl-2-cyclopenten-1-one (CAS-No. 2758-18-1, produced by Kanto Chemical Co., Inc.), 0.01 part by mass of trisodium diethylenetriamine pentaacetate, 0.002 part by mass of polyoxyethylene (20) sorbitan monostearate (trade name: Rheodol TW-S120V, sold by Kao corp.), 1.3 part by mass of water, and 0.7 part by mass of ethanol, and after making stood still in a sealed non-air blow-type drier at 60° C. for 1 hour, it was passed through the JIS standard sieve with a sieve mesh size of 850 μm to obtain the water absorbent resin composition (13).

Example 14

To 100 parts by mass of the water absorbent resin particle (1) obtained in Production Example 1, 2.015 parts by mass of a solution was added and mixed, which solution was obtained by mixing 10 ppm by mass of hexanoic acid (CAS-No. 142-62-1, produced by Wako Pure Chemical Industries, Ltd.), 10 ppm by mass of ethyl butyrate (CAS-No. 105-54-4, produced by Wako Pure Chemical Industries, Ltd.), 10 ppm by mass of 3-methyl-2-cyclopenten-1-one (CAS-No. 2758-18-1, produced by Kanto Chemical Co., Inc.), 0.01 part by mass of trisodium diethylenetriamine pentaacetate, 0.002 part by mass of polyoxyethylene (20) sorbitan monostearate (trade name: Rheodol TW-S120V, sold by Kao corp.), 1.3 part by mass of water, and 0.7 part by mass of ethanol, and after making stood still in a sealed non-air blow-type drier at 60° C. for 1 hour, it was passed through the JIS standard sieve with a sieve mesh size of 850 μm to obtain the water absorbent resin composition (14).

Example 15

To 100 parts by mass of the water absorbent resin particle (1) obtained in Production Example 1, a solution was added and mixed, which solution was obtained by mixing 0.14 part by mass of the dry distillation extract of bamboo, 0.06 part by mass of ethanol and 2 parts by mass of water, and after making stood still in a sealed non-air blow-type drier at 60° C. for 1 hour, it was passed through the JIS standard sieve with a sieve mesh size of 850 μm to obtain the water absorbent resin composition (15).

Example 16

To 100 parts by mass of the water absorbent resin particle (1) obtained in Production Example 1, a solution was added and mixed, which solution was obtained by adding 0.047 part by mass of the dry distillation extract of bamboo, 0.02 part by mass of ethanol, 2 parts by mass of water, and still more 0.02 part by mass of the dry distillation extract of tea, and after making stood still in a sealed non-air blow-type drier at 60° C. for 1 hour, it was passed through the JIS standard sieve with a sieve mesh size of 850 μm to obtain the water absorbent resin composition (16).

Comparative Example 1

By performing similar operation except that trisodium diethylenetriamine pentaacetate was not used in Production Example 1, the surface cross-linked comparative water absorbent resin particle (1) was obtained.

Comparative Example 2

To 100 parts by mass of the comparative water absorbent resin particle (1) obtained in Comparative Example 1, 0.5 part by mass of the extract solution of tea of Theaceae plant (trade name: FS-80MO, sold by Shiraimatsu Pharmaceutical Co., Ltd.) was added and mixed, and after making stood still in a sealed non-air blow-type drier at 60° C. for 1 hour, it was passed through the JIS standard sieve with a sieve mesh size of 850 μm to obtain the comparative water absorbent resin composition (1).

Comparative Example 3

To 100 parts by mass of the water absorbent resin particle (1) obtained in Production Example 1, 2.00125 parts by mass of a solution was added and mixed, which solution was obtained by mixing 0.00125 part by mass of the extract solution of bamboo (trade name: Neobamboos-2000, sold by Shiraimatsu Pharmaceutical Co., Ltd.), and 2.0 parts by mass of water, and after making stood still in a sealed non-air blow-type drier at 60° C. for 1 hour, it was passed through the JIS standard sieve with a sieve mesh size of 850 μm to obtain the comparative water absorbent resin composition (3).

Comparative Example 4

To 100 parts by mass of the water absorbent resin particle (1) obtained in Production Example 1, 2.25 parts by mass of a solution was added and mixed, which solution was obtained by mixing 0.25 part by mass of the solution of the extract of tea leaves of Theaceae plant (trade name: FS-80MO, sold by Shiraimatsu Pharmaceutical Co., Ltd.), and 2.0 parts by mass of water, and after making stood still in a sealed non-air blow-type drier at 60° C. for 1 hour, it was passed through the JIS standard sieve with a sieve mesh size of 850 μm to obtain the comparative water absorbent resin composition (4).

Comparative Example 5

Using 100 parts by mass of the water absorbent resin particle (1) obtained in Production Example 1, and by a method similar to that in Example 14 of JP-B-3026080, the comparative water absorbent resin composition (5) was obtained. Specifically, to 100 parts by mass of the water absorbent resin particle (1) obtained in Production Example 1, 0.17 part by mass of a 30% aqueous solution of didecyldimethylammonium gluconate was added and still more 1.2 part by mass of "Fresh Shiraimatsu" (produced by Shiraimatsu Pharmaceutical Co., Ltd.) was added and mixed uniformly with Nauta mixer for 30 minutes. The resultant water absorbent resin particle was passed through JIS standard sieve with a sieve mesh size of 850 μm to obtain the comparative water absorbent resin composition (5).

Comparative Example 6

To 100 parts by mass of the water absorbent resin particle (1) obtained in Production Example 1, 2.0 parts by mass of a solution was added and mixed, which solution was obtained by mixing 1.3 part by mass of water and 0.7 part by mass of ethanol, and after making stood still in a sealed non-air blow-type drier at 60° C. for 1 hour, it was passed through the JIS standard sieve with a sieve mesh size of 850 μm to obtain the comparative water absorbent resin composition (6).

Comparative Example 7

To 100 parts by mass of the water absorbent resin particle (1) obtained in Production Example 1, 3.512 parts by mass of a solution was added and mixed, which solution was obtained by mixing 0.5 part by mass of hexanoic acid (CAS-No. 142-62-1, produced by Wako Pure Chemical Industries, Ltd.), 0.5 part by mass of ethyl butyrate (CAS-No. 105-54-4, produced by Wako Pure Chemical Industries, Ltd.), 0.5 part by mass of 3-methyl-2-cyclopenten-1-one (CAS-No. 2758-18-1, produced by Kanto Chemical Co., Inc.), 0.01 part by mass of trisodium diethylenetriamine pentaacetate, 0.002 part by mass of polyoxyethylene (20) sorbitan monostearate (trade name: Rheodol TW-S120V, sold by Kao corp.), 1.3 part by mass of water, and 0.7 part by mass of ethanol, and after making stood still in a sealed non-air blow-type drier at 60° C. for 1 hour, it was passed through the JIS standard sieve with a sieve mesh size of 850 μm to obtain the comparative water absorbent resin composition (7).

Comparative Example 8

To 100 parts by mass of the water absorbent resin particle (1) obtained in Production Example 1, a solution was added and mixed, which solution was obtained by mixing 0.14 part by mass of the dry distillation extract of bamboo and 2 parts by mass of water, and after making stood still in a sealed non-air blow-type drier at 60° C. for 1 hour, it was passed through the JIS standard sieve with a sieve mesh size of 850 μm to obtain the comparative water absorbent resin composition (8).

Comparative Example 9

To 100 parts by mass of the water absorbent resin particle (1) obtained in Production Example 1, a solution was added and mixed, which solution was obtained by mixing 0.5 part by mass of the dry distillation extract of bamboo and 2 parts by mass of water, and after making stood still in a sealed non-air blow-type drier at 60° C. for 1 hour, it was passed through the JIS standard sieve with a sieve mesh size of 850 μM to obtain the comparative water absorbent resin composition (9).

Comparative Example 10

To 100 parts by mass of the water absorbent resin particle (1) obtained in Production Example 1, 2.0 parts by mass of water and 1.0 part by mass of the bamboo powder were added and mixed, and after making stood still in a sealed non-air blow-type drier at 60° C. for 1 hour, it was passed through the JIS standard sieve with a sieve mesh size of 850 µm to obtain the comparative water absorbent resin composition (10).

It should be noted that as the above bamboo powder, "Bamboo powder" (bamboo powder) (trade name, produced by Ban Co., Ltd.) was still more ground using a hammer mill, and one which passed through a sieve of a particle size of 500 µm, was used. The water content of the resultant bamboo powder was 7.9% by mass.

Production of the Absorbent Material

Example 17

Two parts by mass of the water absorbent resin composition (1) obtained in Example 1, and 2 parts by mass of wood ground pulp were subjected to dry-type mixing using a mixer. Then, the resultant mixture was spread on a wire screen formed to have 400 mesh (an opening size of 38 µm) to form a web with a diameter size of 90 mmϕ. Further, by pressing this web under a pressure of 196.14 kPa (2 kgf/cm$^2$) for 1 minute, an absorbent material (1) having a basis weight of about 0.06 g/cm$^2$ was obtained.

Example 18

By performing similar operation as in Example 17, except by using the water absorbent resin composition (7) obtained in Example 7, the absorbent material (2) was obtained.

Example 19

By performing similar operation as in Example 17, except by using the water absorbent resin composition (13) obtained in Example 13, the absorbent material (3) was obtained.

Example 20

By performing similar operation as in Example 17, except by using the water absorbent resin composition (14) obtained in Example 14, the absorbent material (4) was obtained.

Comparative Example 11

By performing similar operation as in Example 17, except by using the comparative water absorbent resin composition (2) obtained in Comparative Example 2, the comparative absorbent material (1) was obtained.

Comparative Example 12

By performing similar operation as in Example 17, except by using the comparative water absorbent resin composition (3) obtained in Comparative Example 3, the comparative absorbent material (2) was obtained.

Comparative Example 13

By performing similar operation as in Example 17, except by using the comparative water absorbent resin composition (6) obtained in Comparative Example 6, the comparative absorbent material (3) was obtained.

Comparative Example 14

By performing similar operation as in Example 17, except by using the comparative water absorbent resin composition (7) obtained in Comparative Example 7, the comparative absorbent material (4) was obtained.

Comparative Example 15

By performing similar operation as in Example 17, except by using the comparative water absorbent resin composition (10) obtained in Comparative Example 10, the comparative absorbent material (5) was obtained.

(Measuring Methods for Property Values)

(a) Particle Size

It was measured in accordance with a measurement method described in WO2004/069404. That is, the water absorbent resin was sieved with JIS standard sieves (JIS Z8801-1(2000) each having a sieve mesh size of 850 µm, 710 µm, 600 µm, 500 µm, 425 µm, 300 µm, 212 µm, 150 µm, 106 µm and 45 µm, or sieves equivalent to these, and residual, percent R was plotted in logarithmic probability paper. Then, particle diameter corresponding to R=50% by weight was read, as the weight average particle diameter (D50). In addition, the logarithm standard deviation (σζ) was calculated by the following expression 1. The smaller value of σζ means the narrower particle size distribution.

[Expression 1]

$$\sigma\zeta = 0.5\ ln(X_2/X_1)$$

Wherein $X_1$ represents particle diameter corresponding to R=84.1%, and $X_2$ represents particle diameter corresponding to R=15.9%.

(b) Absorbency Against Pressure (AAP)

Absorbency against pressure was measured in accordance with EDANA (European Disposables And Nonwovens Association) regulation, ERT442.1-99 (Feb99). It should be noted that, in the measurement, a load of 1.9 kPa or 4.9 kPa including a piston was added uniformly, and the absorbency against pressure (g/g) under 1.9 kPa or 4.9 kPa was measured. It should be noted that, in the present description, the absorbency against pressure under 1.9 kPa may also be expressed as AAP1.9, and the absorbency against pressure under 4.9 kPa may also be expressed as AAP4.9.

(c) The Centrifuge Retention Capacity (CRC)

The centrifuge retention capacity (also referred to as "the absorbency against non-pressure") means absorbency against a 0.90% by mass sodium chloride solution under non-pressure for 30 minutes. 0.200 g of the water absorbent resin composition was put into a bag (85 mm×60 mm) made of non-woven fabric (trade name: Heatron paper, model-type: GSP-22, produced by Nangoku Pulp K.K.), heat sealed and then immersed into a large excess (usually about 500 ml) of the 0.90% by mass sodium chloride solution (an aqueous solution of sodium chloride) at room temperature. After 30 minutes, the bag was pulled up, rinsed under centrifugal force (250 G) described in ERT441.1-99 (Reb99), using a centrifuge (model-type: H-122, manufactured by Kokusan Co., Ltd.) for 3 Minutes, and then mass $W_1$ (g) of the bag was measured. In addition, similar operation was performed without using the water absorbent resin composition, and mass $W_0$ at that time was measured. Then from these $W_1$ and $W_0$, the centrifuge retention capacity (g/g) was calculated according to the following expression 2.

[Expression 2]

$$\text{The centrifuge retention capacity } (g/g) = \{(W_1(g) - W_0(g))/\text{mass of the water absorbent resin composition }(g)\} - 1$$

(d) The Amount of a Water-soluble Polymer (it May Also be Referred to as "Amount of Water-soluble Portions" or "Soluble Portions")

It was measured in accordance with EDANA regulation, ERT470.1-99 (Feb99). That is, after stirring 1.000 g of the water absorbent resin composition in 200 ml of the 0.90% sodium chloride solution for 16 hours with a 3 cm stirrer under 500 rpm, pH titration was performed on a water-soluble polymer (Extractable), which is an extract in the filtrate. The amounts of the water-soluble polymer of the water absorbent resin produced in Production Example 1 and the water absorbent resin compositions produced in Examples 1 to 16 were all equal to or lower than 15% by mass.

(e) Evaluation of the Surface Color of the Water Absorbent Resin Composition

Evaluation of the surface color of the water absorbent resin composition was performed by reflection measurement using a spectroscopic color difference meter, SZ-E80 COLOR MEASURING SYSTEM, manufactured by Nippon Denshoku Industries Co., Ltd. In the measurement, using an attached container for powder and paste with an inner diameter of 30 mm and a height of 12 mm, and using a standard white circular plate No. 2 for powder and paste as a standard sample, and a 30 Φ floodlight pipe were used. Into the attached container for powder and paste, about 5 g of the water absorbent resin composition was filled to measure the WB value with the color difference meter.

(f) Residual Monomers

Amount of the residual monomers (residual acrylic acid (salt)) (ppm by mass) of the water absorbent resin composition was measured with liquid chromatography by UV analysis of the filtrate prepared by using a method similar to the above (d) except by setting stirring for 2 hours. In addition, the residual monomers of the water-containing gel before drying was determined similarly with liquid chromatography by UV analysis of the filtrate prepared by stirring the minced water-containing gel containing about 500 mg of resin solid content for 16 hours, and by correction for the solid content. The amounts of the residual monomers of the water absorbent resin produced in Production Example 1, and the water absorbent resin compositions produced in Examples 1 to 16 were all equal to or lower than 300 ppm by mass.

(g) A deodorization Test

Swollen gel was formed by putting 50 ml of human urine collected from 20 adults into a 120 ml polypropylene cup with a cover, and adding 2.0 g of the water absorbent resin composition therein. As the human urine, one collected within 2 hours after excretion was used. By putting a cover on this container, the swollen gel was maintained at 37° C. After 6 hours from liquid absorption, the cover was opened to judge deodorant effect by sniffing smell by 20 adult panelists, from a position of about 3 cm from the upper part of the cup. The judgment was performed using the following 6-stage judgment standards, and evaluation was performed by determining average value of total points of all members. It should be noted that, the evaluation obtained by using only human urine without adding the water absorbent resin composition and performing similar operation, was made as a standard sample, and the deodorant effect was evaluated as the rank 5 of odor thereof.

0: non-odor
1: odor only slightly perceivable
2: odor perceivable but tolerable
3: odor easily perceivable
4: strong odor
5: very strong odor (h) An Antimicrobial Test A Presence or absence of antimicrobial property was confirmed using *Escherichia coli* (IFO3806). One showing less proliferation of *Escherichia coli* than a comparative control after 1 day at 37° C. was judged having antimicrobial property.

(i) An Antimicrobial Test B

Presence or absence of antimicrobial property was confirmed using *Escherichia coli* (IFO3806). The cultured bacterial liquid was added into the water absorbent resin composition to measure surviving organisms count after making stood still at room temperature for 6 hours, and one showing less proliferation of *Escherichia coli* than a comparative control (in the case where surviving organisms count is reduced equal to or more than two digits than the comparative control) was judged having antimicrobial property.

(j) An Antimicrobial Test C 1 ml of the above cultured bacterial liquid was added into 0.5 g of the water absorbent resin composition. After making stood still at room temperature for 6 hours, bacteria was washed out using 40 ml of a sterilized normal saline solution formulated with 1%-TWEEN60, to measure surviving organisms count. As culture medium, standard agar culture medium was used, and 10 times step-wise dilution was performed, and microbial colony count was performed by an agar plate smear method. Culture was performed at 35° C. for 48 hours, and *Escherichia coli* (IFO3806) was used as a bacterial species.

(k) Evaluation of Urine Resistance

Firstly, 0.05% by mass of L-ascorbic acid was added to a normal saline solution (0.90% by mass aqueous solution of sodium chloride) to prepare an evaluation solution. Water-containing gel was obtained by putting 2 g of the water absorbent resin or the water absorbent resin composition into the 120 ml polypropylene container (an inner diameter of 54 mm) with a cover, and adding the evaluation solution. This water-containing gel was stood still in constant temperature constant humidity chamber (a temperature of 37° C. and a relative humidity of 90%) under sealing by closing a cover.

After 16 hours and 20 hours from start of standing still, a state of the water-containing gel was observed with visual inspection. Urine resistance was evaluated by the following criteria: ○; a stable state without collapse of the water-containing gel, Δ; a partially collapsed and solution-like state of the water-containing gel, expressing thread-forming property, and ×; a completely collapsed and solution-like state of the water-containing gel.

(l) A Malodor Removal Test-A (A Measurement Test for Removal Rate of Hydrogen Sulfide)

5.0 g of the water absorbent resin composition and 25 ml of a normal saline solution were charged into a 400 ml sealable container, and stood still for 10 minutes to prepare swollen gel. After that, 0.1 μl of hydrogen sulfide gas was charged and sealed (concentration in the container was adjusted to 210 ppm). Then, after making the solution stood still at room temperature for 3 hours, concentration of residual gas was analyzed by gas chromatography. In addition, as a blank test, only predetermined amount of hydrogen sulfide gas was charged into the 400 ml sealable container to analyze concentration of residual gas by gas chromatography, after making stood still at room temperature for 3 hours. Removal ratio in the present test was calculated as reduction ratio of concentration of residual gas to the blank test.

(m) A Malodor Removal Test-B (A Measurement Test for Removal Rate of Methylmercaptan)

5.0 g of the water absorbent resin composition and 25 ml of a normal saline solution were charged into a 400 ml sealable container, and 1 ml of a 0.03% aqueous solution of sodium methylmercaptan was charged and sealed (concentration in the container was adjusted to 18 ppm). Then, after making the solution stood still at room temperature for 3 hours, concentration of residual gas was analyzed by gas chromatography. In addition, as a blank test, only predetermined amount of hydrogen sulfide gas was charged into the 400 ml sealable container, to analyze concentration of residual gas by gas chromatography, after making stood still at room temperature for 3 hours. Removal ratio in the present test was calculated as reduction ratio of concentration of residual gas to the blank test.

(n) Water Content

In accordance with ERT430.2-02 (2002) of EDANA regulation, water content of the water absorbent resin or the water absorbent resin composition was measured. The water contents of the water absorbent resin produced in Production Example 1, and the water absorbent resin compositions produced in Examples 1 to 16 were all equal to or lower than 3% by mass.

(o) Evaluation of Performance of the Absorbent Material

The absorbent material was prepared to evaluate performance as the absorbent material, and evaluation of re-wet was performed.

Firstly, the absorbent material for evaluation was prepared by the following method.

Two parts by mass of the water absorbent resin or the water absorbent resin composition, and 2 parts by mass of wood ground pulp were subjected to dry-type mixing using a mixer. Then, the resultant mixture was spread on a wire screen formed to have 400 mesh (an opening size of 38 μm), to form a web with a diameter size of 90 mmφ. Further, by pressing this web under a pressure of 196.14 kPa (2 kgf/cm$^2$) for 1 minute, an absorbent material for evaluation having a basis weight of about 0.06 g/cm$^2$ was obtained.

Subsequently, evaluation of re-wet was performed by the following method.

At the bottom of SUS Petri dish with an inner diameter of 90 mmφ, the above absorbent material for evaluation was spread and unwoven cloth with a diameter of 90 mmφ was put thereon. Subsequently, a piston and a weight were put, which were adjusted to provide a load of 4.8 kPa uniformly onto the absorbent material. As this piston and weight, one provided with a liquid charging port with a diameter of 5 mm at the center part was used. Next, 25 ml of the normal saline solution (0.90% by mass aqueous solution of sodium chloride) was poured at the center part of the relevant absorbent material for evaluation so as to absorb liquid. After 30 minutes, still more, 25 ml of the normal saline solution (0.90% by mass aqueous solution of sodium chloride) was poured at the center part of the relevant absorbent material for evaluation, so as to absorb liquid. After 30 minutes, the piston and weight, which were adjusted to provide a load of 4.8 kPa uniformly onto the absorbent material, were removed, and 30 sheets of filter paper with outer diameter of 90 mmφ (No. 2, produced by Tohyo Filter Paper Co., Ltd.), whose total weight ($W_1$(g)) was measured in advance, were put on the absorbent material for evaluation, and still more the piston and weight (sum of the piston and weight of 20 kg) with an outer diameter of 90 mmφ, which were adjusted to provide a uniform load onto the above absorbent material, unwoven fabric and filter paper, were put quickly on the filter paper, so as to absorb re-wet by the above filter paper under the load for 10 minutes. After that, weight ($W_2$ (g)) of the 30 sheets of filter paper was measured to determine amount of re-wet for 10 minutes by the following expression 3.

[Expression 3]

Amount of re-wet for 10 minutes $(g)=W_2(g)-W_1(g)$ (p) Evaluation of Urine Resistance of the Absorbent Material The absorbent material was prepared to evaluate performance as the absorbent material, to perform evaluation of re-wet.

Firstly, the absorbent material for evaluation was prepared by a similar method as in the above item (o).

Then, at the bottom of the SUS Petri dish with an inner diameter of 90 mmφ, the above absorbent material for evaluation was spread and unwoven cloth with a diameter of 90 mmφ was put thereon. Subsequently, a piston and a weight were put, which were adjusted to provide a load of 4.8 kPa uniformly onto the absorbent material. As this piston and weight, one provided with a liquid charging port with a diameter of 5 mm at the center part was used. Next, 25 ml of the normal saline solution containing L-ascorbic acid (which was prepared by mixing 90 parts by mass of sodium chloride, 0.5 parts by mass of L-ascorbic acid, and 909.95 g of pure water) was poured at the center part of the relevant absorbent material for evaluation so as to absorb liquid. After 30 minutes, still more 25 ml of the normal saline solution containing L-ascorbic acid (which was prepared by mixing 90 parts by mass of sodium chloride, 0.5 part by mass of L-ascorbic acid, and 909.95 g of pure water) was poured at the center part of the relevant absorbent material for evaluation, so as to absorb liquid for further 30 minutes. The SUS Petri dish was closed to seal, and after 10 hours of liquid absorption at 37° C. by the absorbent material, the piston and weight, which were adjusted to provide a load of 4.8 kPa uniformly onto the absorbent material, were removed, and 30 sheets of filter paper with outer diameter of 90 mmφ (No. 2, produced by Tohyo Filter Paper Co., Ltd.), whose total weight ($W_3$ (g)) was measured in advance, were put quickly on the absorbent material for evaluation, and still more the piston and weight (sum of the piston and weight of 20 kg) with an outer diameter of 90 mmφ, which were adjusted to provide a uniform load onto the above absorbent material, unwoven fabric and filter paper, were put quickly on the filter paper, so as to absorb re-wet by the above filter paper under the load for 10 minutes. After that, weight ($W_4$ (g)) of the 30 sheets of filter paper was measured to determine amount of re-wet for 10 minutes by the following expression 4.

[Expression 4]

Amount of re-wet for 10 minutes $(g)=W_4(g)-W_3(g)$ (q) Evaluation of Deodorizing Performance of the Absorbent Material The absorbent material was prepared to evaluate performance as the absorbent material, to perform evaluation of deodorizing performance of the absorbent material.

Firstly, the absorbent material for evaluation was prepared by a similar method as in the above item (o).

The absorbent material, which absorbed humane urine, was formed, by placing the resultant absorbent material for evaluation in a glass Petri dish (an inner diameter of 120 mmφ), adding 50 ml of human urine collected from 20 adults, sealing the dish by closing a cover at once, and making stood still at 37° C. for 3 hours. As the human urine, one collected within 2 hours after excretion was used. After 3 hours from liquid absorption, the cover was opened to judge deodorant effect by sniffing smell by 20 adult panelists, from a position of about 5 cm from the absorbent material. The judgment was performed using the following 6-stage judgment standards, and evaluation was performed by determining average value of total points of each member recorded. It should be noted that, the evaluation obtained by using only human urine without adding the water absorbent resin composition and performing similar operation, was made as a standard sample, and the deodorant effect was evaluated as the rank 5 of odor thereof.

0: non-odor
1: odor only slightly perceivable
2: odor perceivable but tolerable
3: odor easily perceivable
4: strong odor
5: very strong odor (r) An Antimicrobial Test-D (An Antimicrobial Test of the Absorbent Material)

Presence or absence of antimicrobial property was confirmed using *Escherichia coli* (IFO3806). The cultured bacterial liquid was added into the absorbent material to measure surviving organisms count after making stood still at room temperature for 6 hours, and one showing less proliferation of *Escherichia coli* than a comparative control (in the case where surviving organisms count is reduced equal to or more than two digits than the comparative control) was judged having antimicrobial property.

(s) Evaluation by Visual Inspection

Visual inspection was performed on the absorbent material prepared. In a mixture of the water absorbent resin composition in the absorbent material and pulp, one whose color tone of the water absorbent resin composition is clearly different from color tone of the pulp, and is recognized to be like a foreign substance, was judged as having foreign body sensation, and one not recognized so was judged as having no foreign body sensation.

Physical properties of the water absorbent resin produced in Production Example 1, and the water absorbent resin compositions produced in Examples 1 to 16 and Comparative Examples 1 to 10 were measured in accordance with the above items (a) to (n), to evaluate performance thereof. The results are shown in the following Tables 1 and 2.

TABLE 1

| | (a) Particle size | | | (b) AAP | | | (e) | (g) |
|---|---|---|---|---|---|---|---|---|
| | D50 (μm) | 150 μm pass (% by mass) | σζ | AAP1.9 (g/g) | AAP4.9 (g/g) | (c) CRC (g/g) | Surface colour WB value | Deodorization test |
| Example 1 | 490 | 2.1 | 0.40 | 23 | 22 | 34 | 73 | 2.0 |
| Example 2 | 485 | 2.3 | 0.39 | 23 | 22 | 34 | 73 | 2.4 |
| Example 3 | 492 | 1.8 | 0.38 | 32 | 23 | 34 | 75 | 1.8 |
| Example 4 | 478 | 2.5 | 0.39 | 33 | 23 | 34 | 75 | 2.0 |
| Example 5 | 483 | 2.3 | 0.39 | 32 | 23 | 34 | 74 | 2.3 |
| Example 6 | 360 | 3.2 | 0.36 | 31 | 23 | 34 | 74 | 2.5 |
| Example 7 | 354 | 2.9 | 0.29 | 33 | 23 | 34 | 75 | 2.4 |
| Example 8 | 488 | 2.4 | 0.36 | 33 | 25 | 31 | 73 | 2.1 |
| Example 9 | 475 | 2.3 | 0.38 | 32 | 23 | 34 | 73 | 2.0 |
| Example 10 | 486 | 1.8 | 0.36 | 32 | 23 | 34 | 72 | 2.1 |
| Example 11 | 501 | 2.0 | 0.39 | 31 | 22 | 33 | 65 | 2.3 |
| Example 12 | 463 | 3.5 | 0.40 | 33 | 23 | 34 | 70 | 2.4 |
| Example 13 | 478 | 2.4 | 0.39 | 31 | 23 | 34 | 73 | 2.0 |
| Example 14 | 485 | 2.2 | 0.39 | 31 | 23 | 34 | 73 | 2.4 |
| Example 15 | 496 | 1.7 | 0.39 | 30 | 23 | 34 | 63 | 4.8 |
| Example 16 | 488 | 2.2 | 0.38 | 32 | 23 | 34 | 72 | 2.3 |
| Prod. Exp. 1 | 469 | 2.3 | 0.45 | 23 | 21 | 34 | 75 | 4.8 |
| Com. Exp. 1 | 471 | 2.7 | 0.43 | 18 | 15 | 34 | 64 | 4.8 |
| Com. Exp. 2 | 480 | 2.3 | 0.40 | 18 | 15 | 34 | 62 | 3.2 |
| Com. Exp. 3 | 479 | 2.5 | 0.40 | 30 | 23 | 34 | 73 | 4.7 |
| Com. Exp. 4 | 490 | 3.1 | 0.39 | 30 | 23 | 34 | 72 | 3.3 |
| Com. Exp. 5 | 530 | 1.6 | 0.46 | 27 | 21 | 34 | 62 | 4.5 |
| Com. Exp. 6 | 465 | 3.0 | 0.40 | 23 | 15 | 34 | 64 | 4.8 |
| Com. Exp. 7 | 451 | 3.3 | 0.45 | 23 | 15 | 34 | 58 | 5.8 |
| Com. Exp. 8 | 474 | 2.9 | 0.40 | 28 | 23 | 34 | 63 | 4.8 |
| Com. Exp. 9 | 477 | 2.8 | 0.39 | 28 | 23 | 34 | 58 | 5.0 |
| Com. Exp. 10 | 486 | 2.8 | 0.39 | 24 | 17 | 33 | 51 | 3.2 |

Prod. Exp. Production Example
Com. Exp. Comparative Example

TABLE 2

| | (h) Antimicrobial test-A | (i) Antimicrobial test-B | (j) Antimicrobial test-C | (k) Urine resistance evaluation | (l) Molodor removal test-A (%) | (m) Molodor removal test-B (%) |
|---|---|---|---|---|---|---|
| Example 1 | Yes | Yes | $8.0 \times 10^3$ | ○ | 75 | 61 |
| Example 2 | Yes | Yes | $7.2 \times 10^3$ | ○ | 77 | 71 |
| Example 3 | Yes | Yes | $3.4 \times 10^4$ | ○ | 64 | 55 |
| Example 4 | Yes | Yes | $6.0 \times 10^3$ | ○ | 64 | 60 |
| Example 5 | Yes | Yes | $1.5 \times 10^4$ | ○ | 70 | 58 |
| Example 6 | Yes | Yes | $8.0 \times 10^3$ | ○ | 75 | 69 |

TABLE 2-continued

|  | (h) Antimicrobial test-A | (i) Antimicrobial test-B | (j) Antimicrobial test-C | (k) Urine resistance evaluation | (l) Molodor removal test-A (%) | (m) Molodor removal test-B (%) |
|---|---|---|---|---|---|---|
| Example 7 | Yes | Yes | $1.5 \times 10^4$ | ◯ | 64 | 60 |
| Example 8 | Yes | Yes | $5.0 \times 10^3$ | ◯ | 79 | 75 |
| Example 9 | Yes | Yes | $4.0 \times 10^3$ | ◯ | 85 | 87 |
| Example 10 | Yes | Yes | $2.0 \times 10^3$ | ◯ | 86 | 90 |
| Example 11 | Yes | Yes | $1.0 \times 10^3$ | ◯ | 86 | 95 |
| Example 12 | Yes | Yes | $2.5 \times 10^3$ | ◯ | 75 | 80 |
| Example 13 | Yes | Yes | — | ◯ | — | — |
| Example 14 | Yes | Yes | — | ◯ | — | — |
| Example 15 | Yes | Yes | $5.0 \times 10^3$ | △ | 25 | 30 |
| Example 16 | Yes | Yes | $2.0 \times 10^3$ | ◯ | 73 | 75 |
| Prod. Exp. 1 | No | No | $1.6 \times 10^6$ | X | 5 | 11 |
| Com. Exp. 1 | No | No | $1.6 \times 10^6$ | X | 9 | 22 |
| Com. Exp. 2 | No | No | $1.6 \times 10^6$ | X | 49 | 46 |
| Com. Exp. 3 | Yes | Yes | $1.6 \times 10^4$ | X | 10 | 20 |
| Com. Exp. 4 | No | No | $1.6 \times 10^6$ | X | 46 | 45 |
| Com. Exp. 5 | Yes | Yes | $2.0 \times 10^3$ | X | 45 | 43 |
| Com. Exp. 6 | No | No | — | X | — | — |
| Com. Exp. 7 | No | No | — | X | — | — |
| Com. Exp. 8 | No | Yes | $1.0 \times 10^4$ | X | 25 | 29 |
| Com. Exp. 9 | Yes | Yes | $2.5 \times 10^3$ | X | 28 | 31 |
| Com. Exp. 10 | No | No | — | X | — | — |

Prod. Exp. Production Example
Com. Exp. Comparative Example

Physical properties of the absorbent materials produced in Examples 17 to 20 and Comparative Examples 11 to 12 were measured in accordance with the above items (o) to (s), to evaluate performance thereof. The results are shown in the following Table 3.

TABLE 3

|  | (o) Absorbent material performance 10 min. re-wet (g) | (p) Absorbent material urine resistance 10 min. re-wet (g) | (q) Absorbent material deodorant property | (r) Antimicrobial test-D | (s) Eval. by naked eyes (Foreign material feeling) |
|---|---|---|---|---|---|
| Example 17 | 2 | 5 | 2.2 | Yes | No |
| Example 18 | 3 | 5 | 2.4 | Yes | No |
| Example 19 | 2 | 4 | 1.8 | Yes | No |
| Example 20 | 2 | 5 | 2 | Yes | No |
| Com. Exp. 11 | 10 | 25 | 5 | No | Yes |
| Com. Exp. 12 | 10 | 24 | 4.8 | No | Yes |
| Com. Exp. 13 | 7 | 28 | 5 | No | Yes |
| Com. Exp. 14 | 10 | 30 | 5.7 | No | Yes |
| Com. Exp. 15 | 12 | 28 | 3.2 | No | Yes |

Com. Exp. Comparative Example

As shown in Tables 1 to 3, by using both of the extract of bamboo and the extract of tea, it was understood that antimicrobial property and deodorant property were enhanced significantly. Further, as shown in Table 3, it was understood that also urine resistance is enhanced significantly.

In addition, by using hexanoic acid, ethyl butyrate, and 3-methyl-2-cyclopenten-1-one, it was shown that antimicrobial property and deodorant property, urine resistance and color hue are enhanced. Further, as shown in Table 3, antimicrobial property and deodorant property, urine resistance and color hue are enhanced significantly in the absorbent material as well.

Further, by using the alcoholic solution of the extract of bamboo, it was shown that significant deodorant property and antimicrobial property can be exerted, as compared with the case of not using alcohol.

It should be noted that, the present application is based on JP2007-264662 filed on Oct. 10, 2007, Japanese Patent Application No. 2008-104250, filed on Apr. 14, 2008, Japanese Patent Application No. 2008-225857 filed on Sep. 3, 2008, and Japanese Patent Application No. 2008-225858 filed on Sep. 3, 2008, the content of which is hereby incorporated by reference in its entirety into this application.

The invention claimed is:

1. A water absorbent resin composition, which comprises:
   a water absorbent resin containing a polyacrylic acid (salt)-based water absorbent resin as a main component; and
   a dry distillation extract of bamboo and a dry distillation extract of tea.

2. A water absorbent resin composition, which comprises:
   a water absorbent resin containing a polyacrylic acid (salt)-based water absorbent resin as a main component; and
   at least two kinds of compounds selected from a group consisting of hexanoic acid (salt), ethyl butyrate, and 3-methyl-2-cyclopenten-1-one.

3. The water absorbent resin composition according to claim 2, further comprising an extract of tea.

4. The water absorbent resin composition according to claim 2, further comprising an extract of bamboo.

5. A water absorbent resin composition, which comprises: a water absorbent resin containing a polyacrylic acid (salt)-based water absorbent resin as a main component; and a dry distillation extract of bamboo and an alcohol.

6. The water absorbent resin composition according to claim 1, further comprising a chelating agent.

7. The water absorbent resin composition according to claim 1, further comprising an inorganic powder or an organic powder.

8. The water absorbent resin composition according to claim 1, further comprising a polyvalent metal salt.

9. The water absorbent resin composition according to claim 1, further comprising a surfactant.

10. The water absorbent resin composition according to claim 1, wherein absorbency against pressure (AAP) for 60 minutes against 0.90% by mass aqueous solution of sodium chloride under 1.9 kPa or 4.8 kPa of the composition is equal to or higher than 20(g/g).

11. The water absorbent resin composition according to claim 1, wherein the content of particles of less than 150 μM is 0 to 5% by mass, mass average particle diameter (D50) is 200 to 600 μm, and logarithmic standard deviation ($\sigma\zeta$) of particle diameter distribution is 0.20 to 0.40.

12. A method for producing a water absorbent resin composition, which comprises a step of adding an alcoholic solution of a dry distillation extract of bamboo before or after polymerization of an unsaturated monomer containing a acrylic acid (salt) as a main component.

13. A method for producing a water absorbent resin composition, which comprises a step of adding an alcoholic solution containing at least two kinds of compounds selected from a group consisting of hexanoic acid (salt), ethyl butyrate, and 3-methyl-2-cyclopenten-1-one to an unsaturated monomer containing an acrylic acid (salt) as a main component.

14. The method for producing a water absorbent resin composition according to claim 12, wherein a dry distillation extract of tea is further added.

15. The water absorbent resin composition according to claim 3, further comprising an extract of bamboo.

16. The water absorbent resin composition according to claim 1, further comprising a chelating agent.

17. The water absorbent resin composition according to claim 2, further comprising a chelating agent.

18. The water absorbent resin composition according to claim 3, further comprising a chelating agent.

19. The water absorbent resin composition according to claim 4, further comprising a chelating agent.

20. The water absorbent resin composition according to claim 5, further comprising a chelating agent.

* * * * *